(12) United States Patent
Fusco et al.

(10) Patent No.: US 12,279,669 B2
(45) Date of Patent: Apr. 22, 2025

(54) FOOTWEAR ARTICLE FOR WALKING

(71) Applicant: KEEN, Inc., Portland, OR (US)

(72) Inventors: Ciro Fusco, Portland, OR (US); Rory W. Fuerst, Atherton, CA (US)

(73) Assignee: KEEN, INC., Portland, OR (US)

( * ) Notice: Subject to any disclaimer, the term of this patent is extended or adjusted under 35 U.S.C. 154(b) by 141 days.

(21) Appl. No.: 18/163,221

(22) Filed: Feb. 1, 2023

(65) Prior Publication Data
US 2023/0172309 A1 Jun. 8, 2023

Related U.S. Application Data

(63) Continuation-in-part of application No. 16/784,165, filed on Feb. 6, 2020, now Pat. No. 11,633,009.

(60) Provisional application No. 62/802,123, filed on Feb. 6, 2019.

(51) Int. Cl.
A43B 13/14 (2006.01)

(52) U.S. Cl.
CPC .................. *A43B 13/145* (2013.01)

(58) Field of Classification Search
CPC ... A43B 13/145; A43B 13/026; A43B 13/141; A43B 3/0057
See application file for complete search history.

(56) References Cited

U.S. PATENT DOCUMENTS

| | | | |
|---|---|---|---|
| 2,810,213 A | 10/1957 | Jonas | |
| 4,098,010 A | 7/1978 | Rothmayer | |
| 4,155,180 A | 5/1979 | Phillips | |
| 4,206,558 A | 6/1980 | Bivona | |
| 4,247,996 A | 2/1981 | Grapin et al. | |
| 4,372,059 A | 2/1983 | Ambrose | |
| 5,135,450 A | 8/1992 | Smith, IV | |
| 6,421,935 B1 | 7/2002 | Bartlett | |
| 6,782,639 B1 | 8/2004 | Müller | |
| D650,979 S | 12/2011 | Marku | |
| 8,529,411 B2 | 9/2013 | DiGiovanni | |

(Continued)

FOREIGN PATENT DOCUMENTS

| KR | 100798868 B1 | 2/2008 |
|---|---|---|
| KR | 20090081710 A | 7/2009 |

OTHER PUBLICATIONS

"Pébiott: primitive foot comfort," Pébiott Website, Available Online at http://pebiott.com/, Available as Early as Oct. 23, 2017, 20 pages.

(Continued)

*Primary Examiner* — Bao-Thieu L Nguyen
(74) *Attorney, Agent, or Firm* — McCoy Russell LLP

(57) ABSTRACT

Footwear articles for walking are provided. In one example, a footwear article may include an upper, a midsole coupled to the upper, an outsole coupled to the midsole, and a moderation plate positioned within the midsole, the moderation plate including a toe-off section, a heel section, and a midfoot section positioned intermediate the toe-off section and the heel section, the moderation plate having a plate length that extends from the toe-off section to the heel section that is within a range of 60-95% of an outsole length of the outsole. In this way, the moderation plate may provide rigidity to the midsole while increasing cushion and enhancing propulsion. In turn, a wearer of the footwear article may smoothly walk for extended periods of time with reduced fatigue.

16 Claims, 20 Drawing Sheets

(56) References Cited

U.S. PATENT DOCUMENTS

| | | |
|---|---|---|
| 9,655,401 B2 | 5/2017 | Colpack |
| 9,770,066 B2 | 9/2017 | Grelle et al. |
| 9,878,229 B2 | 1/2018 | Lefebvre et al. |
| 10,292,452 B2 | 5/2019 | Hansen et al. |
| 2003/0079373 A1 | 5/2003 | Geer et al. |
| 2007/0068043 A1 | 3/2007 | Clark et al. |
| 2008/0289215 A1 | 11/2008 | Park |
| 2009/0183393 A1 | 7/2009 | Lee |
| 2009/0193687 A1 | 8/2009 | Kim |
| 2010/0146819 A1 | 6/2010 | Teteriatnikov et al. |
| 2010/0146825 A1 | 6/2010 | Teteriatnikov et al. |
| 2010/0263228 A1 | 10/2010 | Kang |
| 2010/0263234 A1 | 10/2010 | Teteriatnikov et al. |
| 2010/0275471 A1 | 11/2010 | Teteriatnikov et al. |
| 2010/0299969 A1 | 12/2010 | Paez |
| 2010/0307028 A1 | 12/2010 | Teteriatnikov et al. |
| 2011/0067269 A1 | 3/2011 | Luo |
| 2011/0072690 A1 | 3/2011 | Teteriatnikov et al. |
| 2011/0185593 A1 | 8/2011 | Ramos |
| 2012/0167414 A1 | 7/2012 | Shrairman |
| 2014/0047740 A1 | 2/2014 | Tucker et al. |
| 2014/0230281 A1 | 8/2014 | Engell |
| 2014/0276317 A1 | 9/2014 | Batterson et al. |
| 2015/0033582 A1 | 2/2015 | Colpack |
| 2015/0164179 A1 | 6/2015 | Walborn et al. |
| 2015/0289594 A1 | 10/2015 | Rushbrook et al. |
| 2016/0345668 A1 | 12/2016 | Dyer et al. |
| 2016/0345675 A1 | 12/2016 | Bruce et al. |
| 2017/0224048 A1 | 8/2017 | Nagano et al. |
| 2017/0258175 A1 | 9/2017 | Li |
| 2018/0184756 A1 | 7/2018 | Bartel et al. |
| 2018/0213886 A1* | 8/2018 | Connell ............... A43B 13/125 |
| 2018/0255868 A1 | 9/2018 | Cole |
| 2019/0150562 A1* | 5/2019 | Bartel .................... A43B 13/22 |
| 2021/0085025 A1 | 3/2021 | Geis et al. |

OTHER PUBLICATIONS

ISA Korean Intellectual Property Office, International Search Report and Written Opinion Issued in Application No. PCT/US2020/016884, May 25, 2020, WIPO, 12 pages.

* cited by examiner

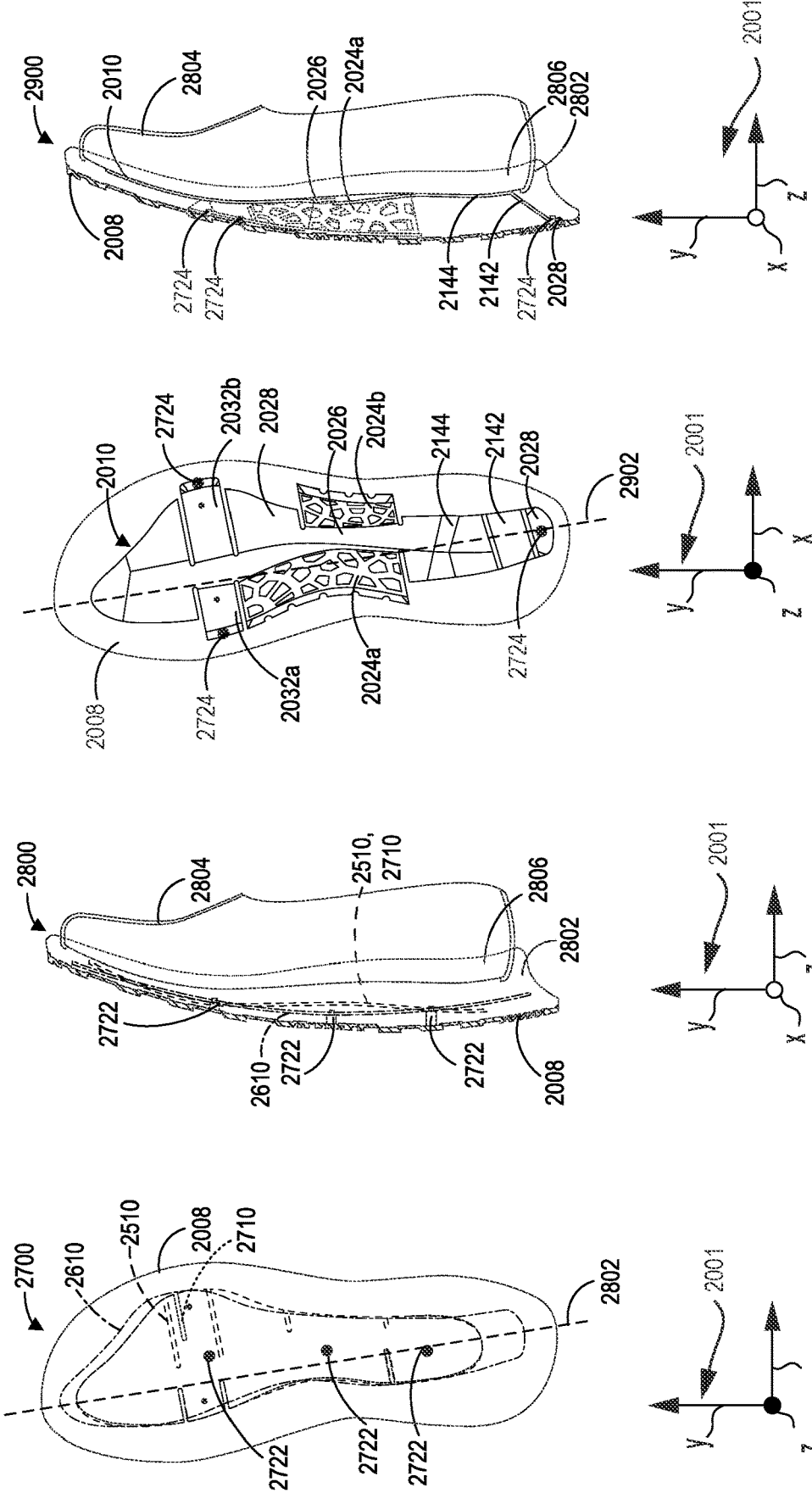

FOOTWEAR ARTICLE FOR WALKING

CROSS REFERENCE TO RELATED APPLICATIONS

The present application is a continuation-in-part of U.S. patent application Ser. No. 16/784,165, entitled FOOTWEAR ARTICLE FOR WALKING, and filed on Feb. 6, 2020, which claims priority to U.S. Provisional Application No. 62/802,123, entitled FOOTWEAR ARTICLE FOR WALKING, and filed on Feb. 6, 2019. The entire contents of the above-listed applications are hereby incorporated by reference for all purposes.

BACKGROUND/SUMMARY

Walking is one of the primary gaits of locomotion for humans. Walking is defined or modeled by an "inverted pendulum" gait in which the body vaults over the stiff limb with each step, such that the center of mass oscillates vertically from step to step. Walking is typically slower than other gaits, such as running, and may be further distinguished from gaits such as running or jogging by considering that only one foot leaves contact with the ground at a time.

Footwear articles are thus designed differently for different gaits, as the mechanics of the body are different. For example, footwear articles designed for running are typically constructed to provide additional cushioning in the heel which is the point of impact, to provide shock absorption. Meanwhile, footwear articles designed specifically for walking are typically constructed to be more flexible through the ball of the foot to allow a greater range of motion through the roll of the forefoot.

The inventors have recognized several drawbacks with this traditional approach. For example, the range of oscillation of the center of mass may be rather large, such that a walking motion may be considered "bouncy" with excessive energy expenditure. Further, the flexing of the ankle joint and the metatarsal joint adjacent to the ball of the foot during the stance phase (i.e., from heel strike to toe off) results in substantial energy loss. As a result, even if some footwear articles designed for walking may be comfortable due to properly positioned cushioning and flexibility, a user of such footwear may become fatigued after walking for an extended period of time.

To at least partially address the above issues, the inventors herein have taken alternative approaches to footwear construction. In one example, a footwear article may include an upper, a midsole coupled to the upper, an outsole coupled to the midsole, and a moderation plate positioned within the midsole, the moderation plate including a toe-off section, a heel section, and a midfoot section positioned intermediate the toe-off section and the heel section, the moderation plate having a plate length that extends from the toe-off section to the heel section that is within a range of 60-95% of an outsole length of the outsole. In this way, the moderation plate may impart a rigidity to the midsole which promotes smooth rolling of the foot while walking. In this way, the loss of energy at the metatarsal joint is minimized and overall energy expenditure during walking is reduced. In turn, a wearer of the footwear article may smoothly walk for extended periods of time with reduced fatigue.

BRIEF DESCRIPTION OF THE FIGURES

FIG. 28A schematically shows a top view of the fifth, sixth, and seventh moderation plates superimposed on an outsole;

FIG. 28B schematically shows a medial side view of the fifth, sixth, and seventh moderation plates incorporated into a footwear article;

FIG. 29A schematically shows a top view of the fourth moderation plate superimposed on an outsole;

FIG. 29B schematically shows a medial side view of the fourth moderation plate incorporated into a footwear article.

DETAILED DESCRIPTION

Figure 3:
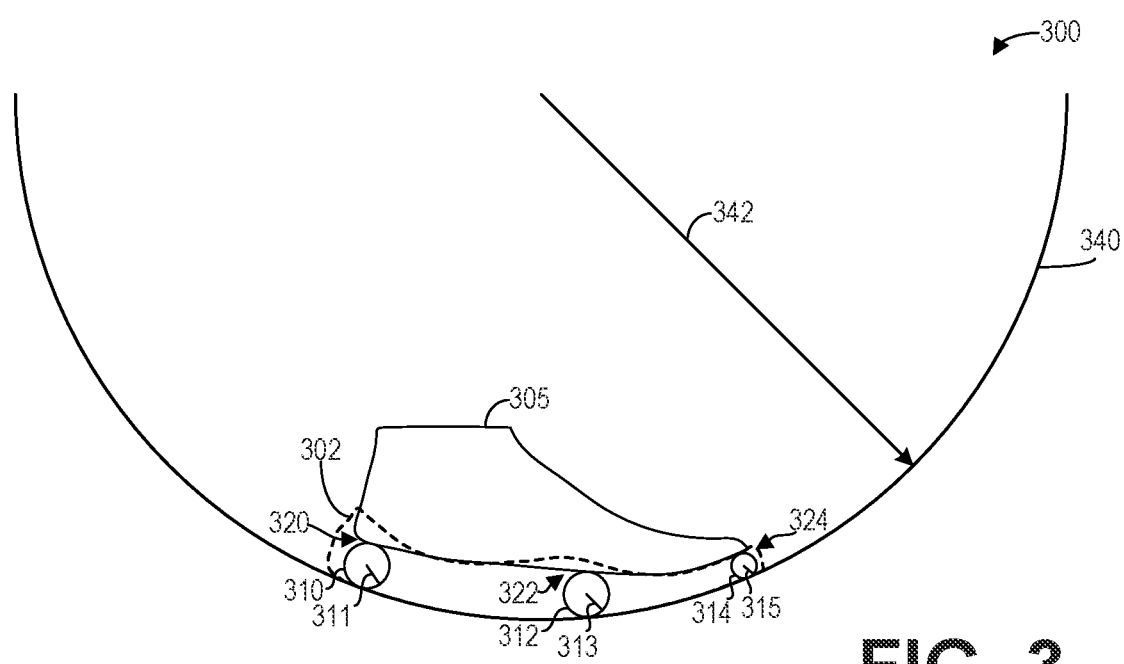
FIG. 3 shows a diagram illustrating constant curvature for a midsole.
Figure 4:
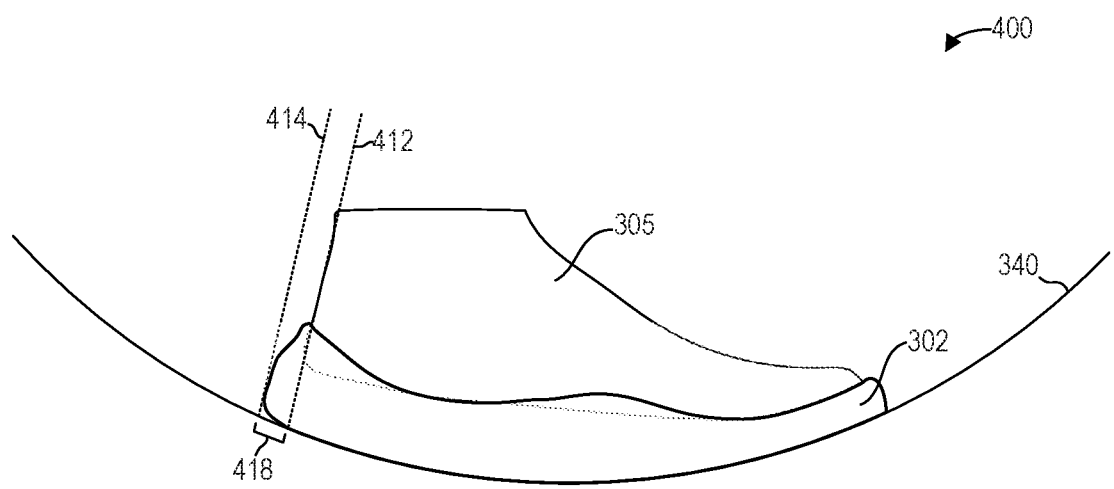
FIG. 4 shows a diagram illustrating an example rear extension for a curved midsole.
Figure 5:
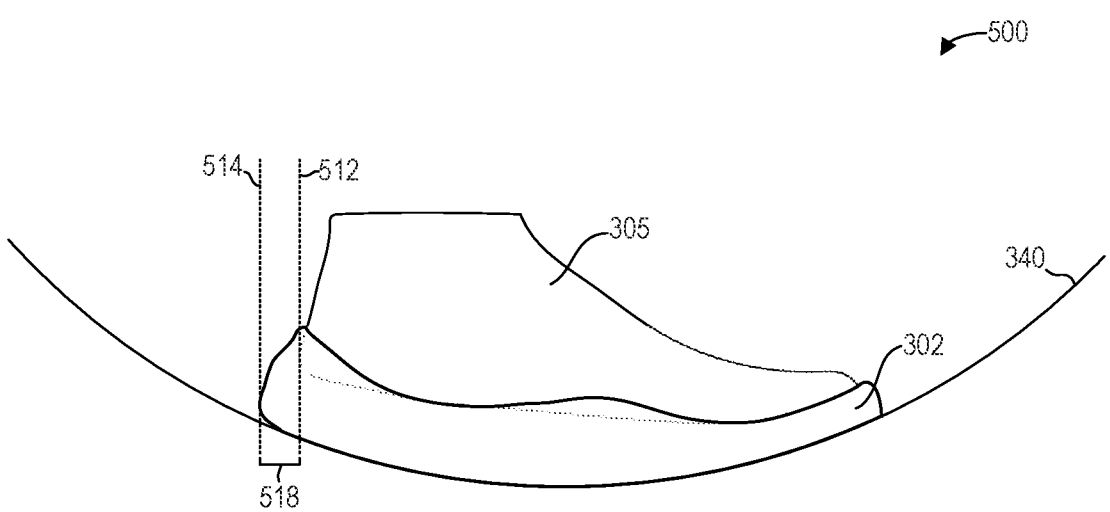
FIG. 5 shows a diagram illustrating another example rear extension for a curved midsole.
Figure 6:
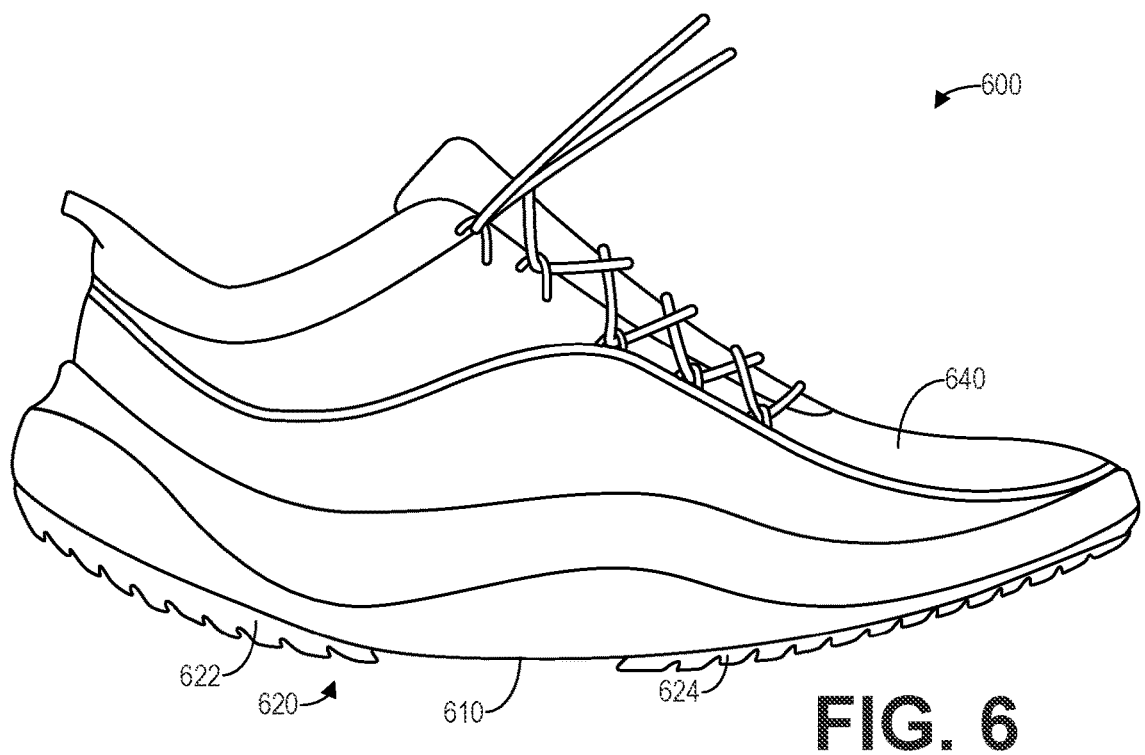
FIG. 6 shows a footwear article with a curved midsole and an example two-part upper.
Figure 7:
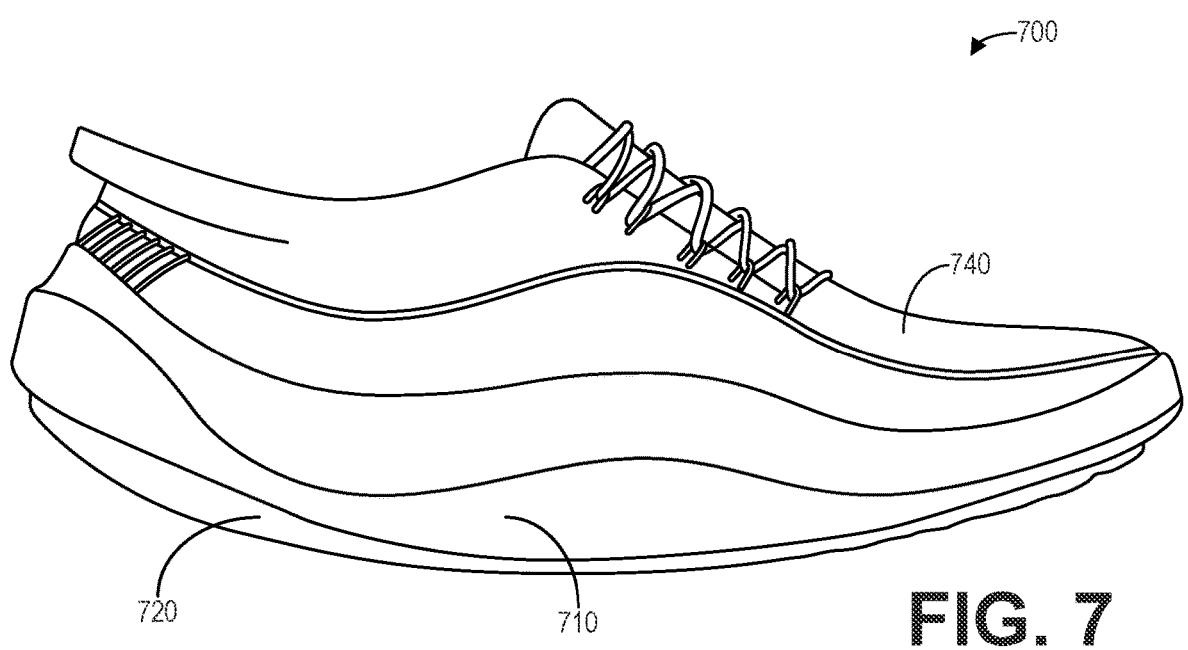
FIG. 7 shows a footwear article with a curved midsole and another example two-part upper.
Figure 8:
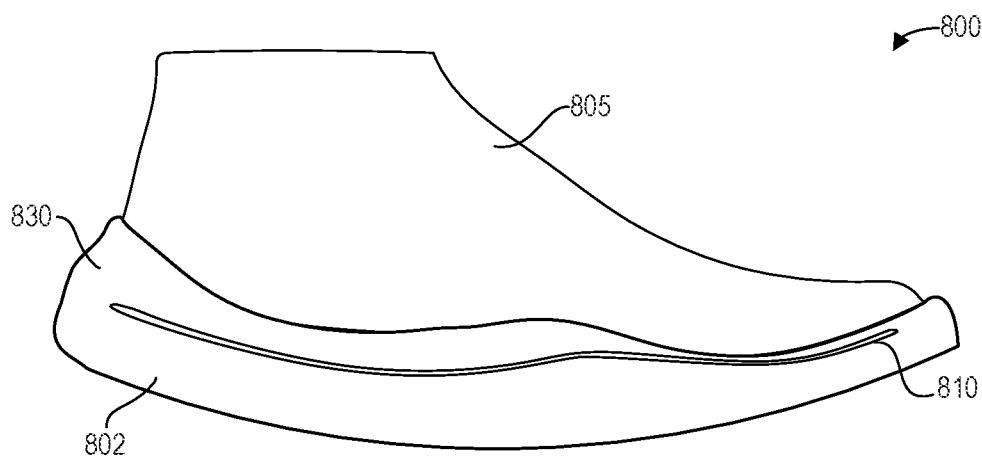
FIG. 8 shows a diagram illustrating a side view of a footwear article with a moderation plate in a curved midsole.
Figure 9:
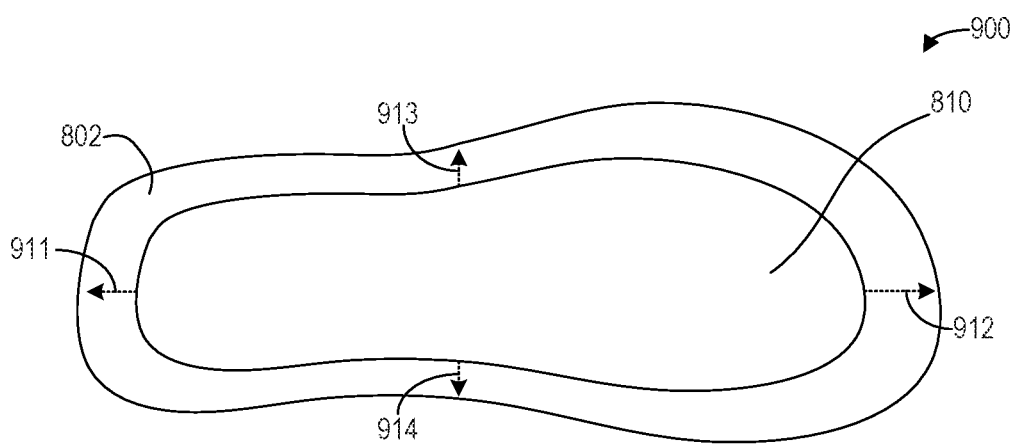
FIG. 9 shows a diagram illustrating a top view of a moderation plate in a curved midsole.
Figure 10:
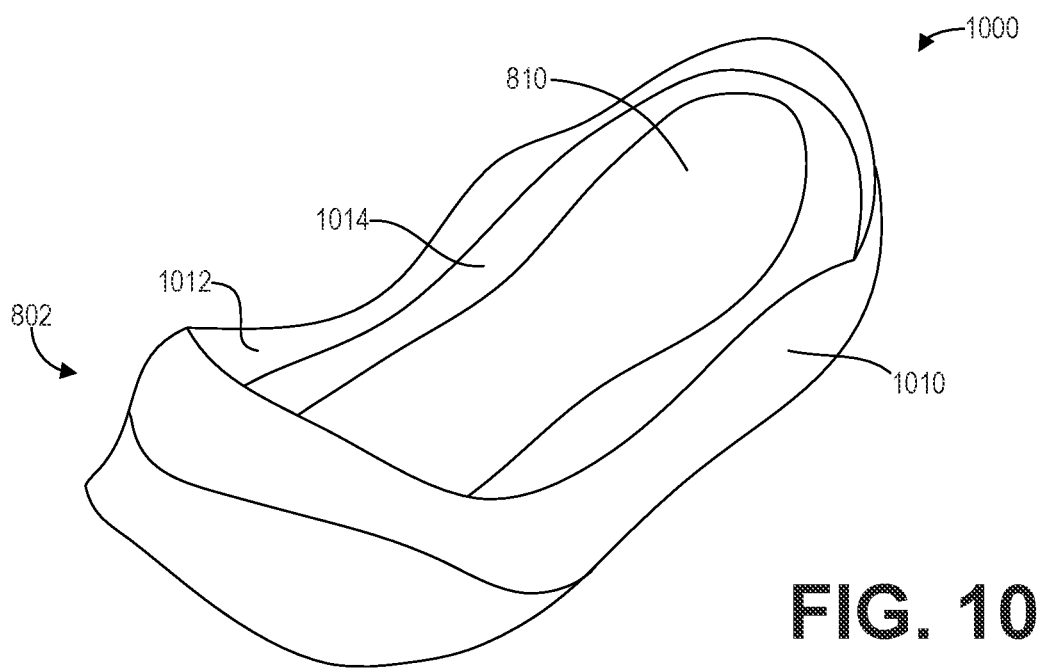
FIG. 10 shows a diagram illustrating a perspective view of a moderation plate in a curved midsole.
Figure 17:
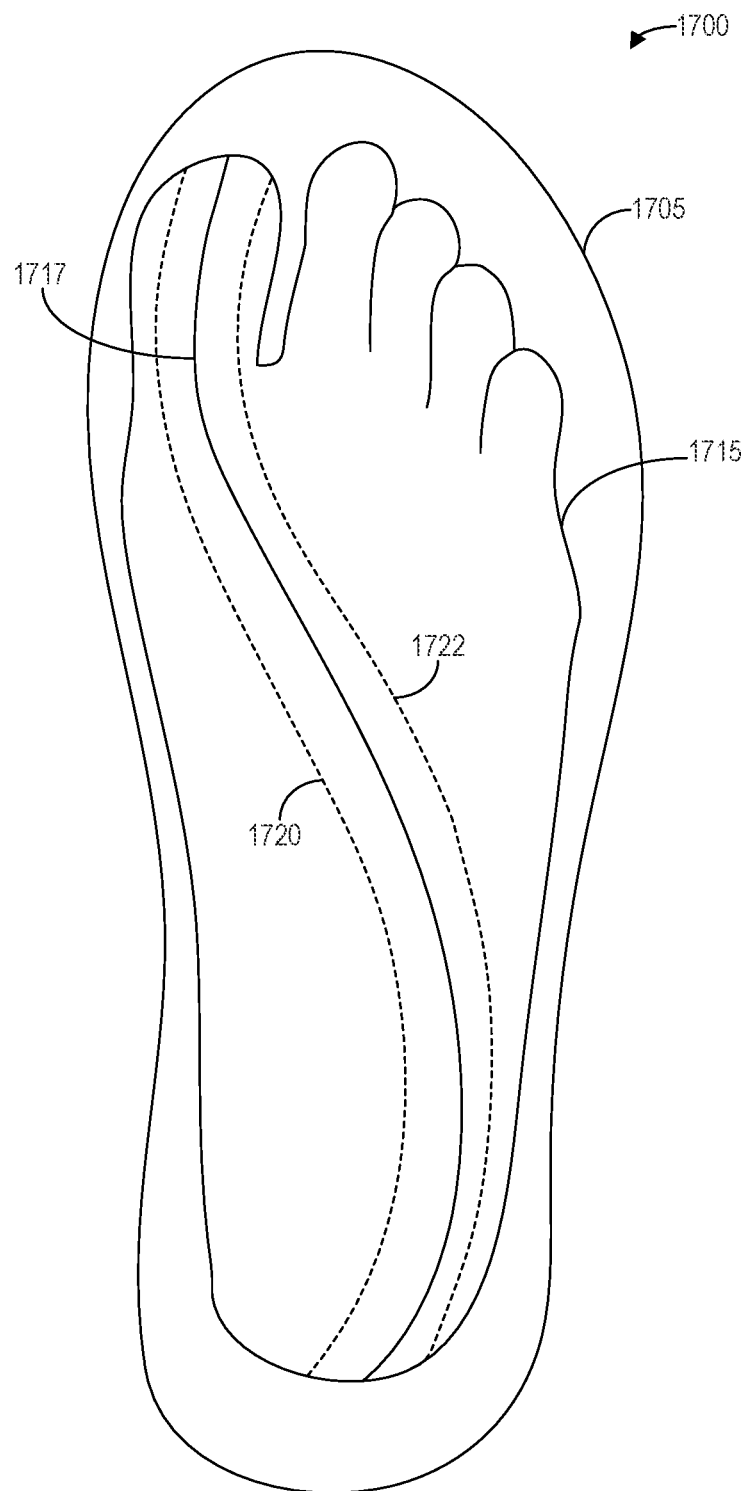
FIG. 17 shows a diagram illustrating a center-of-pressure line relative to a midsole for selective placement of traction elements.
Figure 18:
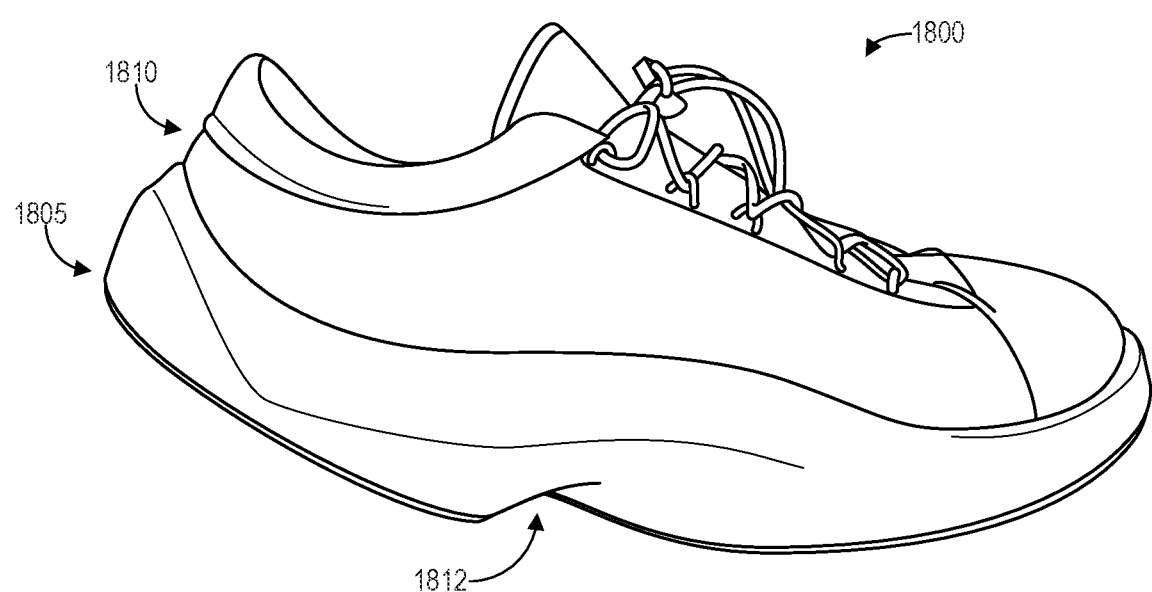
FIG. 18 shows a side lateral view of a footwear article with a curved midsole with minimized materials according to a center-of-pressure line.
Figure 19:
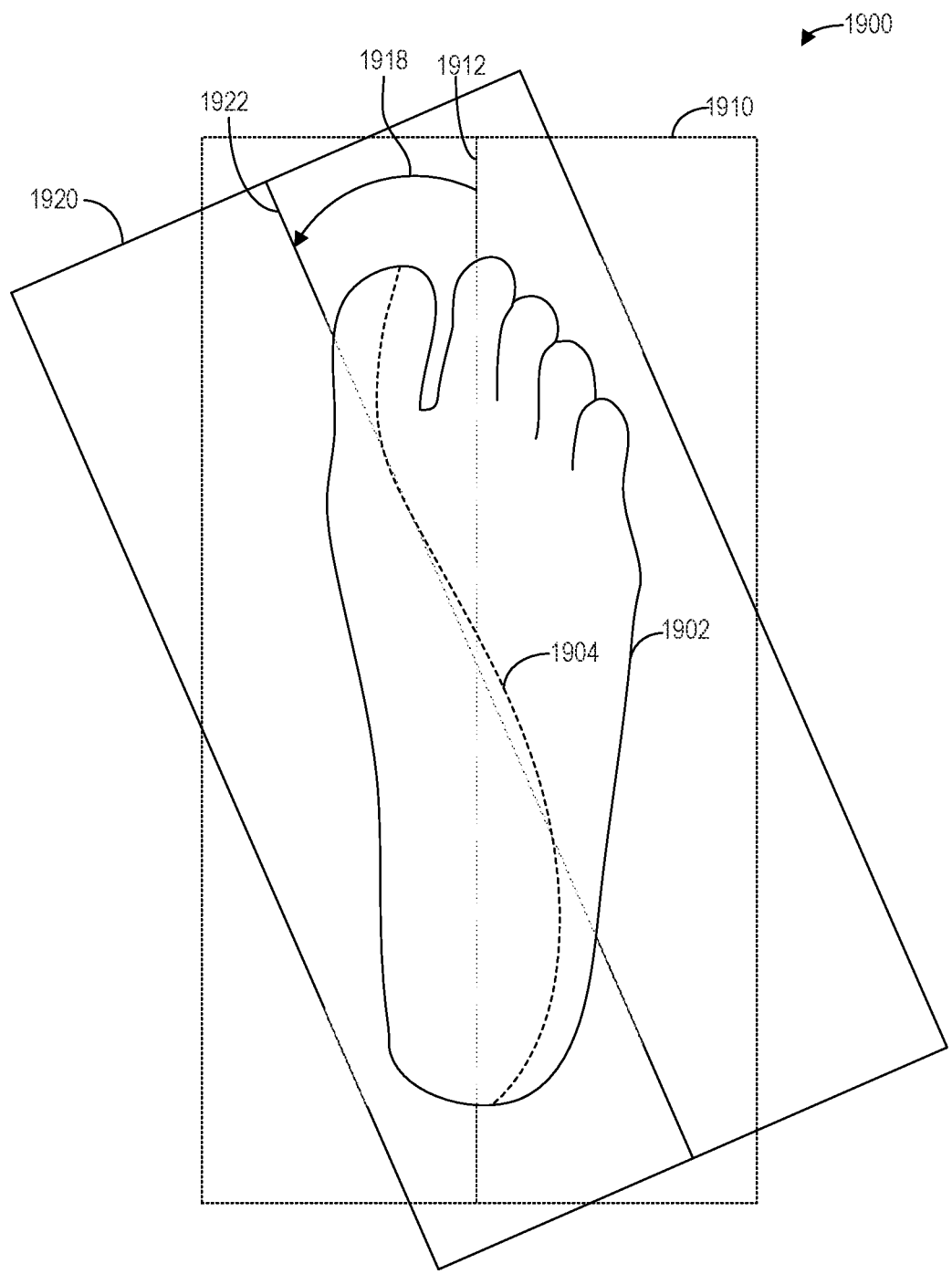
FIG. 19 shows a diagram illustrating a rotation of curvature of a curved midsole relative to the center-of-pressure line.

Systems and methods for a footwear article are described herein. A footwear article, such as the footwear articles shown in FIGS. 1A and 1B, include curved midsoles with a constant curvature along the sagittal plane for reducing energy expenditure and improving efficiency during walking. Example soles including curved midsoles are depicted in FIGS. 2A-2D. In particular, the curvature of the midsole along the longitudinal axis (i.e., heel to toe) relative to the position of a foot within the footwear article, as depicted in FIG. 3, enables a smooth step-to-step transition during walking and a smaller range of oscillation of the center of mass. As depicted in FIGS. 4 and 5, the heel of the midsole may be elongated as well as curved to further reduce the range of oscillation of the center of mass without affecting the gait. The curved midsole profile may be implemented with different styles of upper as well as different traction elements for an outsole, as depicted in FIGS. 6 and 7. A moderation plate may be positioned within a cavity of the curved midsole, as depicted in FIGS. 8-10, to be as close as possible to a foot positioned with the footwear article. As depicted in FIGS. 11-16, the geometric profile of the moderation plate may be selected to minimize the loss of energy at the metatarsal joint by inhibiting the range of flexion of the metatarsal joint, as well as promote smooth rolling of the foot while walking. Traction elements may be selectively positioned on an outsole of the footwear article in necessary and sufficient regions with consideration of a center-of-pressure line exhibited during normal walking, as depicted in FIG. 17. In some examples, a minimal possible weight of the footwear article may be achieved by removing unnecessary material, such as from the midsole of the footwear article as depicted in FIG. 18, according to the center-of-pressure line. The midsole may be curved along the center-of-pressure line (e.g., the heel-to-toe strike direction) rather than the longitudinal axis of the foot, as depicted in FIG. 19, to further smooth the step-to-step transition during walking. In some examples, the advantageous distribution of forces for a curved midsole may provide better energy performance in comparison to footwear articles without midsoles of constant curvature. Thus the footwear articles provided herein may reduce the forces felt by the walker, preserve the energy that would be lost with the goal of re-using it later in the gait cycle, and reduce the overall loss of energy, thereby reducing the overall energy expenditure. A fourth example moderation plate is coupled to an outsole in FIG. 21-23 and in isolated views in FIG. 23-24 from a plurality of perspectives. The fourth example moderation plate, as well as a fifth example moderation plate and a sixth example moderation plate shown in FIG. 25-26, may be configured to be integrated into a footwear article using a streamlined manufacturing process that uses the same type of midsole mold regardless of the moderation plate that is being incorporated, as demonstrated by the method of FIG. 30. For example, the fourth, fifth, and sixth moderation plates, as well as other moderation plates such as a seventh moderation plate, may be positioned within the midsole using the midsole mold. The fourth, fifth, sixth, and seventh example moderation plates are shown schematically from multiple perspectives in FIG. 27-29B.

As discussed further herein, a footwear article with a sole of constant heel-to-toe curvature provides a number of advantages, including dispersing the load (e.g., the dynamic load) on impact to facilitate application of the load across the sole. When the weight of the person wearing the footwear article touches down, if the force is perceived as concentrated on one flat area (e.g., as in traditional flat-soled footwear articles), the force may be perceived as greater as it will be applied to the single one-dimensional surface, while the curvature of a curved sole as provided herein may provide a perception of a dynamic load dispersion. Further, in some examples, the constant curve of the sole may promote a fluid and consistent transition from heel impact all the way through to toe-off. As the curved sole holds its shape while correlated to the wearer's biomechanics properly, the curved sole may help smooth out the transition from heel to toe. Furthermore, as discussed herein, the constant curve is extended past the point of the actual heel of the wearer, which may effectively lengthen the foot thereby allowing for a shorter stride or increased cadence which in turn may promote efficiency and may reduce the overall time spent on either foot, decreasing the perception of load to each side of the body during a step. As another advantage of the extended heel and curved sole, the footwear article described herein may provide a slight amount of cushion before the transition to the stiffer plate before the full weight of the body has loaded the plate.

For purposes of discussion, one or more drawings are described collectively. Thus, like elements may be commonly referred to herein with like reference numerals and may not be re-introduced. FIGS. 1-29B are shown approximately to scale, though other relative dimensions may be used. As used herein, the term "approximately" is construed to mean plus or minus five percent of the range unless otherwise specified.

Figure 1A:
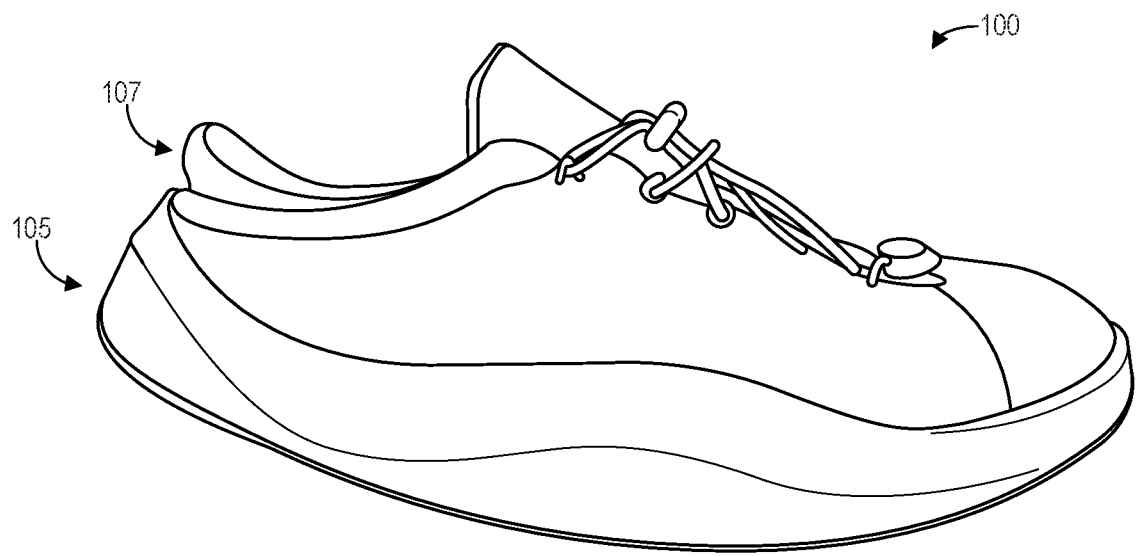
FIG. 1A shows a side lateral view of a footwear article with a curved midsole.

FIG. 1A shows a side lateral view of a footwear article 100 with a curved midsole 105 according to an embodiment. In particular, the midsole 105 of the footwear article 100 is curved along the longitudinal axis to achieve a smooth step-to-step transition and a smaller range of oscillation in the center of mass of a person wearing the footwear article 100 during walking. The curved midsole 105 is coupled to an upper 107 which conforms to a foot (not shown) inserted into the footwear article 100. To that end, the upper 107 may comprise a knitted upper or another suitable type of upper, such as woven fabric, nonwoven fabric, leather, laminate, and/or combinations thereof. The curved midsole 105 is not flexible, such that the curved midsole 105 retains the constant curvature depicted during push-off and collision.

Figure 1B:
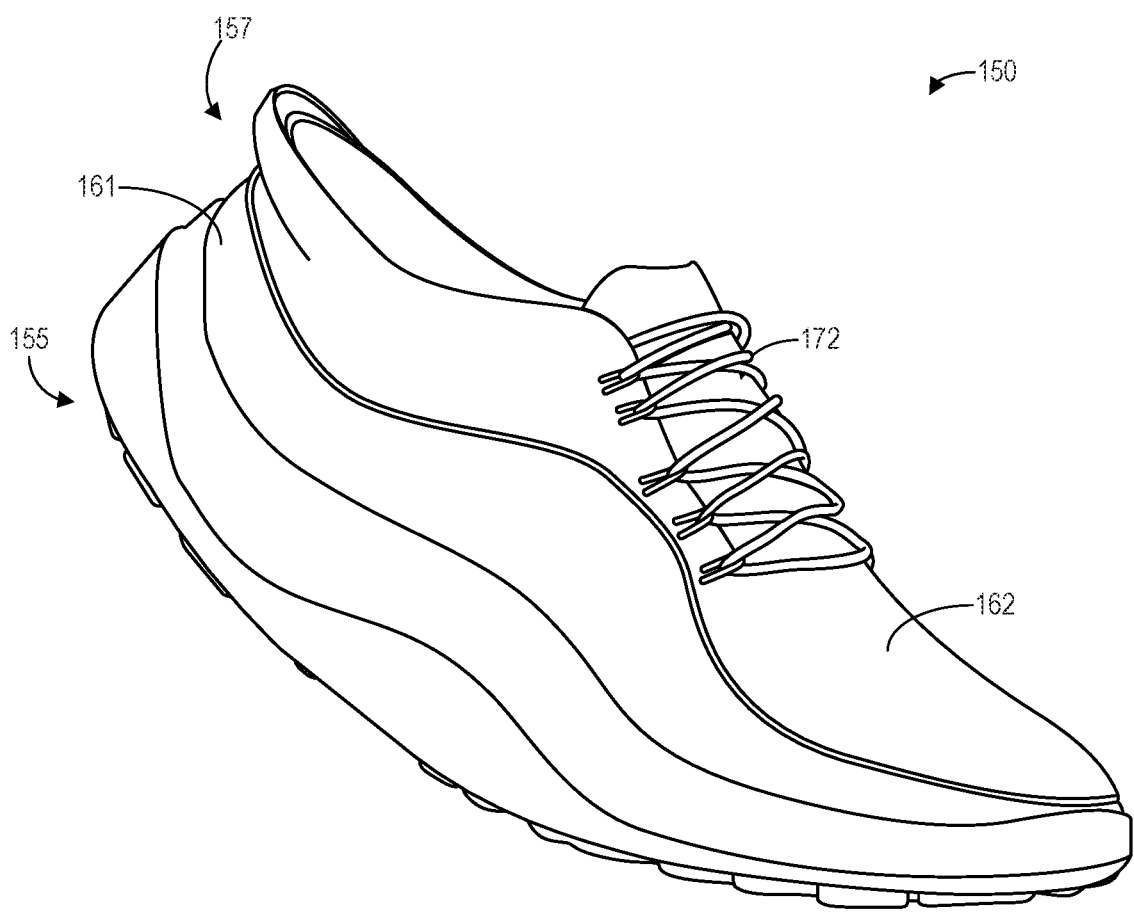
FIG. 1B shows a side lateral perspective view of a footwear article with a curved midsole.

FIG. 1B shows a side lateral perspective view of a footwear article 150 with a curved midsole 155 during a push-off at the toe of the footwear article 150. The upper 157 of the footwear article includes a first upper component 161 and a second upper component 162 of varying stretch to accommodate a foot inserted into the footwear article 150. As an example, the first upper component 161 may be less flexible than the second upper component 162, such that the reduced flexibility of the first upper component 161 helps to restrain the foot relative to the curved midsole 155 while the increased flexibility of the second upper component 162 enables the upper 157 to conform snugly to the foot. Further, a lace cord 172 may be laced through lace bights or loops extending from the second upper component 162 as depicted to allow a tightening of the upper 157 relative to the foot. Both the first upper component 161 and the second upper component 162 may comprise knitted components, for example, or other suitable materials.

Figure 2A:
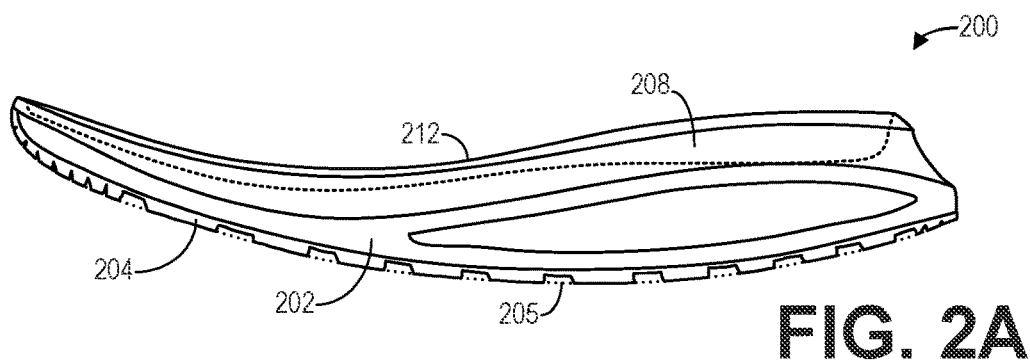
FIG. 2A shows a side medial view of an example curved midsole for a footwear article.

FIGS. 2A-2D show different example sole arrangements for a footwear article. In particular, FIG. 2A shows a side medial view of an example sole 200 comprising a curved midsole 202 as well as a curved outer sole 204. The dotted curve indicates a constant curvature 205 of the outer sole 204 despite the distribution of cutouts to provide traction, as depicted. The dashed line indicates a recessed area 208 of the midsole 202 whereupon a foot of a user wearing a footwear article configured with the sole 200 is positioned. The top 212 of the midsole 202 extends higher than the footbed or insole in the recessed area 208.

Figure 2B:
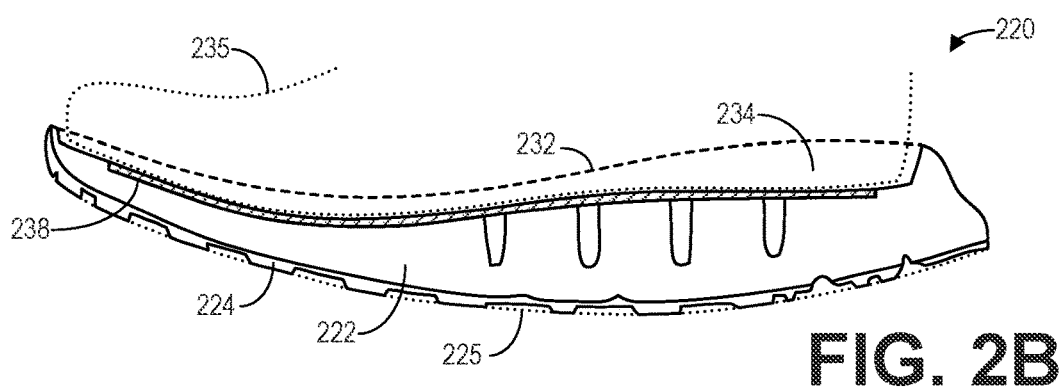
FIG. 2B shows a cross-sectional view of another example curved midsole for a footwear article.

As another example, FIG. 2B shows a side medial cutaway view of another example sole 220 comprising a curved midsole 222 and a curved outer sole 224. The outer sole 224 includes a plurality of cutouts to provide traction, but still curves according to a constant curvature 225. The top 232 of the midsole 222 is depicted as a dashed line due to the cutaway view. Further, the relative position of a foot 235 to the sole 220 is shown. The foot 235 rests within the recessed area 234 of the midsole 222. Further, a moderation plate 238 is positioned in a recess adjacent to the recessed area 234 for the foot 235. As discussed further herein, the moderation plate 238 comprises an inflexible or stiff plate extending from the heel region of the foot 235 to the toe region of the foot 235. The moderation plate 238 is positioned in the center of the footwear article and extends past the known peak pressure zones of the heel and into lesser loaded areas. In this way, energy that would normally be lost or dissipated into the midsole and then into the ground is transferred to the stiff, rigid moderation plate 238. Further, by extending the plate along the length of the foot 235, the initial peak forces of a heel strike are transferred to the plate and carried through the lull of the gait (i.e., the phase between the heel strike and toe-off) and transferred through to the toe-off, which is further supported by the rigid platform of the moderation plate 238. Further, by positioning the moderation plate 238 in the recess of the midsole 222, the moderation plate 238 is positioned as close to the foot 235 as possible to maximize energy capture. Thus the moderation plate 238 provides an energy return such that each step while walking in a footwear article configured with the sole 220 is more powerful while involving less overall energy expenditure by the user in comparison to footwear articles without a moderation plate.

Figure 2C:
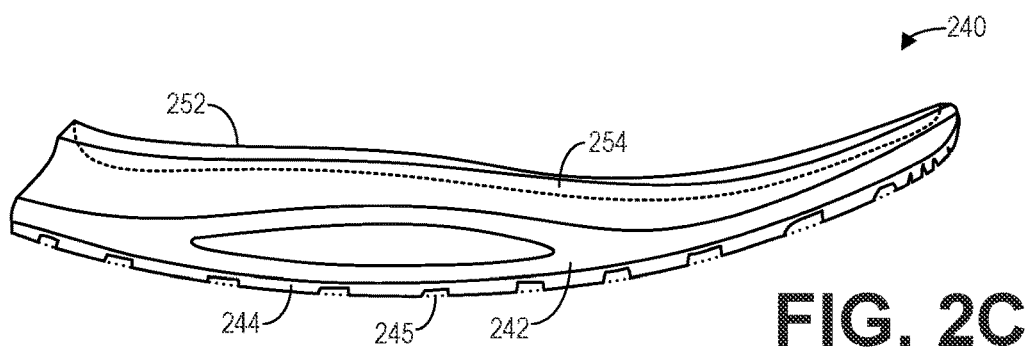
FIG. 2C shows a side lateral view of another example curved midsole for a footwear article.

As another example, FIG. 2C shows a side lateral view of another example sole 240 comprising a curved midsole 242 and a curved outer sole 244. The outer sole 244 includes a plurality of cutouts as depicted for traction, but still follows a constant curvature 245. Similar to the soles 200 and 220, a recessed area 254 in the midsole 242 (bound by the dashed line) is configured to receive a foot, while the top 252 of the midsole 242 extends around the recessed area 254 to form the recessed area 254.

Figure 2D:
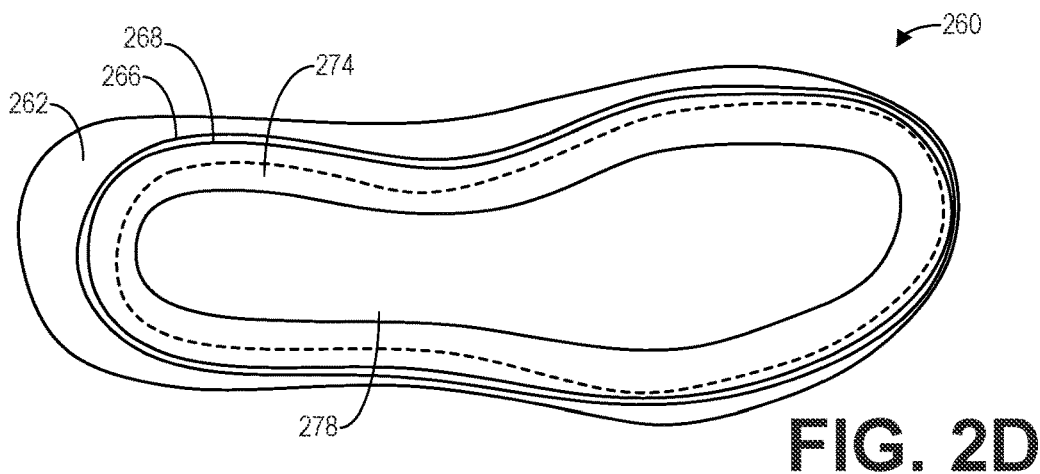
FIG. 2D shows a top view of an example curved midsole for a footwear article.

FIG. 2D shows a top view of an example sole 260 which may comprise a curved midsole 262 as well as a curved outer sole (not shown). The sole 260 may comprise the sole 200, the sole 220, or the sole 240 as described hereinabove. For example, the outer top rim 266 and the inner top rim 268 extend around a recessed area in the midsole 262, with a footbed (also referred to as an insole) 274 at the bottom of the recessed area. Further, a moderation plate 278 is centered in the sole 260 and specifically is centered in the footbed 274. As discussed further herein with regard to FIGS. 4 and 5, the curved midsole 262 extends further away from the heel region of the foot. The width of the midfoot region of the midsole 262 is increased relative to the footbed 274, especially on the medial side, to decrease any possible instability caused by the increased height of the midfoot from the ground resulting from the constant curvature of the midsole 262.

FIG. 3 shows a diagram 300 illustrating constant curvature for a midsole 302 according to an embodiment. In particular, diagram 300 relates to determining a radius 342 of cylinder 340 defining curvature for a midsole 302. To determine the relation of the curvature to a last 305, which corresponds to the shape of a human foot, a plurality of cylinders are positioned under the last 305. In particular, the plurality of cylinders includes a first cylinder 310 with a first radius at a heel 320 of the last 305, a second cylinder 312 with a second radius 313 at a ball 322 of the last 305, and a third cylinder 314 with a third radius 315 at the toe tip 324 of the last 305. The radius of each cylinder 310, 312, and 314 may be selected according to a number of factors, including a heel to toe offset as well as a desired thickness of the midsole at the heel, ball, and tip, respectively. Further, although the cylinder 340 defining the curvature of the midsole 302 is depicted as touching each cylinder 310, 312, and 314 tangentially, it should be appreciated that in some examples the cylinder 340 may be tangentially fit to at least two of the cylinders 310, 312, and 314. For example, the radii 311, 313, and 315 of the cylinders 310, 312, and 314 may be independently selected according to desired thickness of the midsole at the heel, ball, and tip, respectively, as discussed above. However, in some instances it may not be possible to fit the cylinder 340 to all three of the cylinders 310, 312, and 314 as depicted. In such examples, the cylinder 340 may be fit to at least the first cylinder 310 and the second cylinder 312, such that the third radius 315 of the third cylinder 314 is a dependent variable of the radii 311, 313, and 342. In other examples, the cylinder 340 may be fit to the first cylinder 310 and the third cylinder 314, such that the second radius 313 of the second cylinder 312 is a dependent variable of the radii 311, 315, and 342.

As an illustrative example, the first radius 311 may be selected as 5 mm, the second radius 313 may be selected as 7.5 mm, and the third radius 315 may be selected as 12 mm. The radius 342 of the cylinder 340 fit to the first cylinder 310 and the third cylinder 314 is therefore 400 mm. Meanwhile, the radius 342 of the cylinder when fit to the first cylinder 310 and the second cylinder 312 is 450 mm.

It should be appreciated that the pivot position of the footwear article depends on the construction choice (e.g., the relative radii of the cylinders 310, 312, and 314) as well as the radius 342. In general, the pivot position of the footwear article (i.e., the position along the bottom surface of the midsole 302 in contact with a horizontal surface when the footwear article is placed at rest on the horizontal surface, or the point along the bottom surface of the midsole 302 around which the footwear article pivots during a stance phase of walking) may be positioned close to the ball 322.

It should be appreciated that such cylinders may be positioned virtually rather than physically under the last 305 for determining an appropriate radius 342 for a given size of the last 305 which may correspond to a size of a footwear article. As an illustrative example, the radius 342 for a footwear article of men's size 9 in US specification may vary from 380 mm to 500 mm. For example, in some embodiments, the radius 342 may comprise 400 mm for a footwear article of men's size 9 in US specification. The radius 342 may be scaled depending on the size of the footwear article, such that the radius 342 for a footwear article of men's size 12, for example, may range from 380 mm to 600 mm, whereas the radius 342 for a footwear article of women's size 7 may range from 300 cm to 500 cm.

In some examples, a 10 mm heel-toe offset may be provided by adjusting the relative radii of the cylinders 310, 312, and 314. Such an offset provides a lift that encourages forward momentum. It should be appreciated that the last 305 may be adapted to accommodate the heel-toe offset. The toe spring of the last 305 may also be increased relative to typical lasts in order to promote a powerful and complete toe-off and to fully capitalize on the constant curvature of the sole. Further, the last 305 may be adapted with a wide toe box which provides a more stable platform for generating power and thus allows for a more powerful toe-off.

Further, as mentioned hereinabove, the heel of the midsole 302 may be elongated or extend beyond the heel of the last 305. As an example, FIG. 4 shows a diagram 400 illustrating an example rear extension or heel extension for a curved midsole 302. In some examples, as depicted, the distance 418 of the heel extension of the midsole 302 may be measured from the vertical 412 at the heel of the last 305 normal or perpendicular to the cylinder 340 defining the curvature of the midsole 302, to the vertical 414 at the heel of the midsole 302 normal or perpendicular to the cylinder 340. The distance 418 may be selected to reduce the oscillating motion of the center of mass of the person wearing the footwear article, as the extended heel allows the foot of the leading leg (as opposed to the trailing leg) to collide with the ground sooner during a walking motion. Further, the distance 418 is selected such that the gait of a person walking is not affected. The distance 418 may range from 0 mm to 50 mm.

As another example, FIG. 5 shows a diagram 500 illustrating another example rear extension for a curved midsole 302. The distance 518 may be measured from the vertical 512 at the heel of the last 305 normal to a horizontal plane upon which the midsole 302 and last 305 are resting, to the vertical 514 at the heel of the midsole 302 normal to the horizontal plane. The distance 518 may be determined similar to the distance 418 as described above, and may also range from 0 mm to 50 mm.

In some examples, the curved midsole 302 may further include a forward extension, similar to the rear extension depicted in FIGS. 4 and 5, such that a forefoot or toe of the midsole 302 extends outward from a vertical (not shown) at the toe of the last 305. However, such a forward extension may interfere with the gait if the distance of the forward extension is substantial (e.g., greater than 2 cm).

FIG. 6 shows a footwear article 600 with a curved midsole and an example two-part upper 640 similar to the two-part upper 157 described hereinabove with regard to FIG. 1B. The footwear article 600 further includes traction elements 622 and 624 selectively positioned on the curved midsole 610 to form an outer sole or outsole 620 of the footwear article 600 which utilize a center of pressure line as a guiding track for the positioning of the traction elements to optimize traction along the force transfer path. Further, traction elements are not positioned at a center of the footwear article 600, as depicted. As another illustrative example, FIG. 7 shows a footwear article 700 with a curved midsole 710, a curved outer sole or outsole 720, and another example two-part upper 740 similar to the two-part upper 157 described hereinabove.

In some examples, the footwear articles provided herein include a moderation plate for inhibiting the flexion of the metatarsal joint and to minimize the loss of energy during walking. As an example, FIG. 8 shows a diagram illustrating a side cross-sectional view of a footwear article 800 with a moderation plate 810 in a curved midsole 802. The midsole 802 incorporates a full length moderation plate 810 having several possible geometric profiles, as described further herein below with regard to FIGS. 11-16. The moderation plate 810 extends from the heel to the toe along the full length of the sole.

Upon initial contact with the ground, the energy produced by the wearer's weight, gravity, and motion is translated to the plate in the heel strike zone. The extended heel 830 provides a brief moment of cushioning before the full weight of the body is loaded onto the moderation plate 810. The moderation plate 810 is positioned in the center of the footwear article 800 and extends past the known peak pressure zones of the heel and into lesser loaded areas. In this way, more energy that would normally be dissipated into the footwear article 800 and then into the ground is instead transferred into the stiff, rigid moderation plate 810. By extending the moderation plate 810 from the heel to the toe of the wearer, the initial peak force(s) of the heel strike are captured and carried through the lull of the gait and then transferred to toe-off. Further, at the toe-off, the moderation plate 810 supports the motion by acting as a rigid platform for the toes. By providing a secure platform for the foot, with energy-returning materials such as the moderation plate 810, and furthermore by providing a smooth transition from heel strike to toe-off via the curved sole or curved midsole 802, the toe-off is smoother and more powerful while involving less overall energy expenditure by the user.

The moderation plate 810 may be made of any suitable material to achieve optimal and/or required range of stiffness. For example, the moderation plate 810 may be formed from carbon fiber for high-performance embodiments, or alternatively nylon, plastics, or a combination of nylon with another element such as glass for different embodiments.

The moderation plate 810 may be positioned as close as possible to the forefoot, i.e., between the midsole 302 and the sock line of the upper 805. As illustrative examples, FIG. 9 shows a diagram 900 illustrating a top view of a moderation plate 810 in a curved midsole 802, while FIG. 10 shows a diagram 1000 illustrating a perspective view of the moderation plate 810 in the curved midsole 802 relative to an inner wall 1012 of the curved midsole 802, an exterior surface 1010 of the curved midsole 802, and a top surface 1014 of the curved midsole 802. The moderation plate 810 may thus be positioned within a cavity of the midsole 802 which is formed with a same shape as the moderation plate 810 such that the moderation plate 810 is in face-sharing contact with the midsole 802 along the full length of the moderation plate 810 when positioned in the cavity.

Further, as depicted, the length of the moderation plate 810 along the longitudinal axis (i.e., from heel to toe) extends to most of the length of the midsole 802 along the longitudinal axis. The relative size of the moderation plate 810 to the midsole 802 may be as depicted in FIGS. 9 and 10. However, in some examples, the moderation plate 810 may extend further in the toe direction 912 towards and up to the forefront of the midsole 802, in the heel direction 911 towards and up to the heel of the midsole 802, in the lateral direction 913 towards and up to the lateral edge of the midsole 802, and/or in the medial direction 914 towards and up to the medial edge of the midsole 802. In other examples, the moderation plate 810 may be smaller than depicted in one or more of the directions 911, 912, 913, and 914.

The moderation plate 810 has at least two functions, including minimizing the loss of energy at the metatarsal joint by inhibiting the range of flexion of the metatarsal joint, and to work in combination with the midsole 802 to promote a smooth rolling of the foot while walking. The moderation plate 810 reduces the range of motion of the ankle joint, thereby further reducing energy lost during walking.

Figure 11:
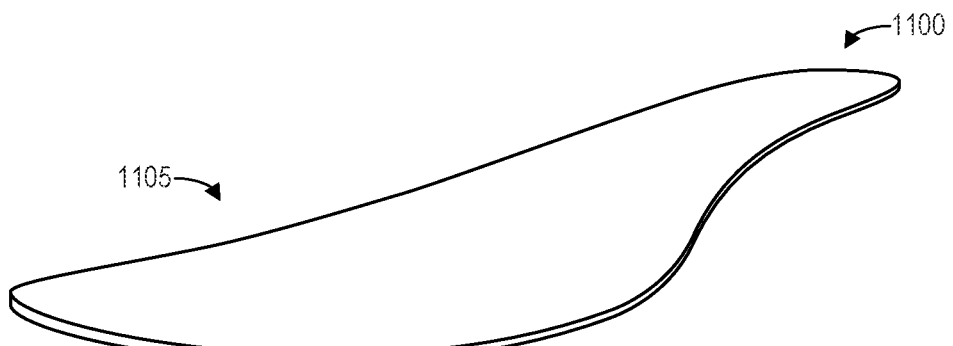
FIG. 11 shows a front medial perspective view of a first example moderation plate.
Figure 12:
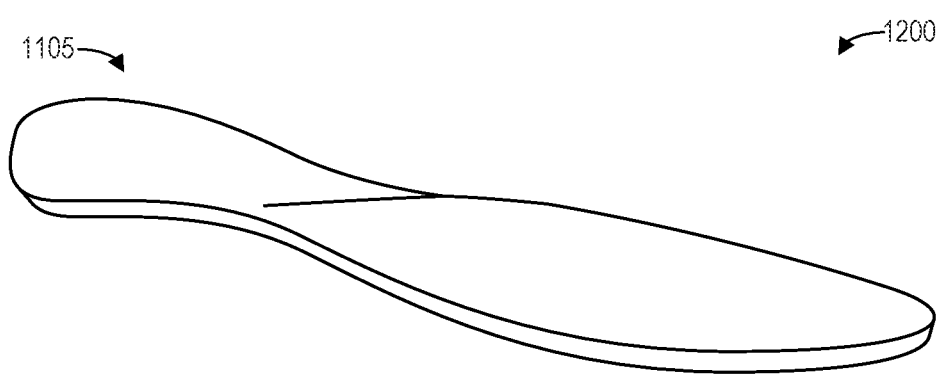
FIG. 12 shows a rear medial perspective view of the first example moderation plate.

As mentioned above, various geometric profiles of the moderation plate 810 may be selected to minimize energy expenditure during walking while also moderating or maintaining the curvature of the midsole 802. For example, the moderation plate may be shaped similar to the moderation plate 238 depicted in FIG. 2B. As another illustrative and non-limiting example, FIG. 11 shows a front medial perspective view 1100 of a first moderation plate 1105 while FIG. 12 shows a rear medial perspective view 1200 of the first moderation plate 1105. The first moderation plate 1105 is a relatively flat plate, with slight curvature to match the metatarsal joint when positioned in the midsole. In particular, as depicted, the first moderation plate 1105 curves slightly downward at the metatarsal joint towards the forefront of the moderation plate 1105, and then slightly up again closer to the toe. Further, the first moderation plate 1105 is relatively flat from the metatarsal joint towards the heel of the moderation plate 1105.

Figure 13:
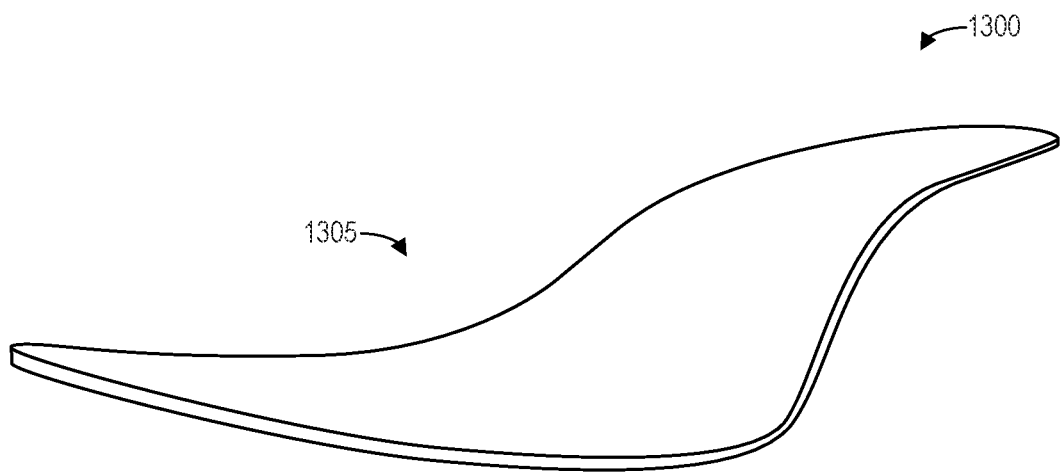
FIG. 13 shows a front medial perspective view of a second example moderation plate.
Figure 14:
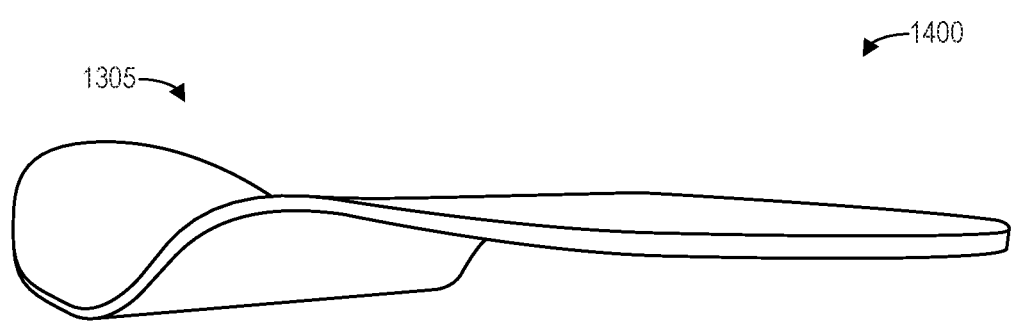
FIG. 14 shows a rear medial perspective view of the second example moderation plate.

As an additional illustrative and non-limiting example of a moderation plate, FIG. 13 shows a front medial perspective view 1300 of a second moderation plate 1305, while FIG. 14 shows a rear medial perspective view 1400 of the second moderation plate 1305. The second moderation plate 1305 exhibits an S-shape with a curvature at the metatarsal joint such that the moderation plate 1305 curves upwards and flattens towards the heel, while curving slightly upwards towards the toe, such that the segment of the moderation plate 1305 near the metatarsal joint is positioned downward relative to the toe and the heel of the moderation plate 1305.

Figure 15:
FIG. 15 shows a front medial perspective view of a third example moderation plate.
Figure 16:
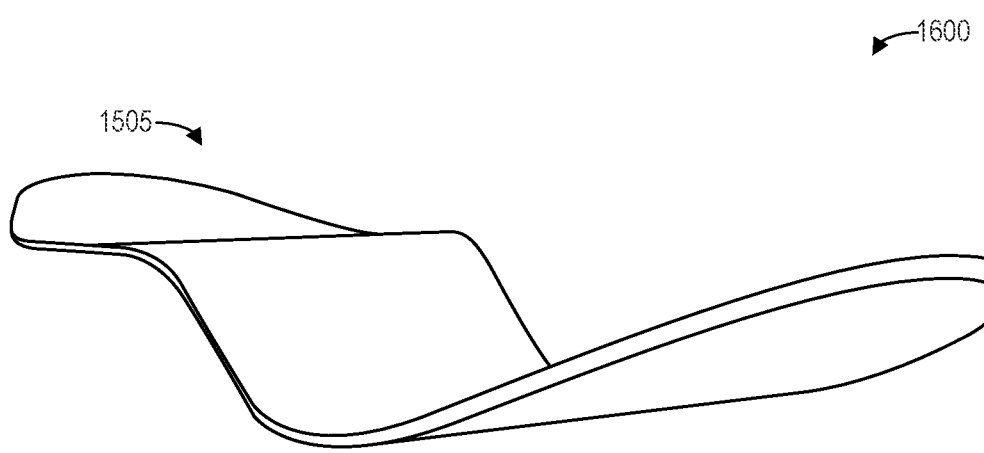
FIG. 16 shows a rear medial perspective view of the third example moderation plate.

As yet another illustrative and non-limiting example of a moderation plate, FIG. 15 shows a front medial perspective view 1500 of a third moderation plate 1505, while FIG. 16 shows a rear medial perspective view 1600 of the third moderation plate 1505. As depicted, the moderation plate 1505 exhibits an S-shape curvature with a flatter region along the forefoot and a slight upwards curvature towards the heel, with the curvature providing the S-shape positioned at the metatarsal joint.

It should be appreciated that the geometric profiles of the moderation plates disclosed herein are distinct from geometric profiles of moderation plates that may be used for footwear articles designed for running or jogging. As mentioned hereinabove, during running or jogging, a substantial amount of force impacts the heel during collision of the foot with the ground, and a moderation plate designed for a footwear article for running would likely be designed with a distinctly different curvature, and possible even an inverted curvature, with respect to the moderation plates described herein, to reduce the impact at the heel and/or to provide recoil energy back to the wearer during running.

Testing indicates that a moderation plate with a shape rather than a flat plate provides better performance, though a moderation plate with too radical of a shape that acts like a spring may introduce biomechanical issues. Locating the plate close to the foot provides a stable platform on top of the cushioned sole, creating one complete unit. This allows the initial energy of the gait coming from bodyweight and gravity to transition directly to the plate which then captures the energy and also creates a stable platform on top of the cushioning provided by the midsole. Generally having a very stiff platform on top of a soft structure is not optimal for stability, and so the plate may be narrower than the overall width of the actual sole to promote stability. Further, the relative softness of the sole allows for deformation of the sole so the plate can move down into the sole and the sole up and around the plate. This allows for comfortable use of the footwear article on flat ground as well as uneven terrain including rocks, roots, or other inconsistent surfaces. If the plate extends too far to the sides, the plate creates a hard surface for the foot to shear off of and over the top of the sole.

Many current plated shoes that include a plate typically sandwich the plate between two layers of foam. This foam sandwiching creates a more cushioned feel which may be preferable in an on-road setting as it allows for a more substantial, immediate cushioning on initial impact followed by the transition of energy to the plate and then additional cushioning under the plate. However, this arrangement has drawbacks when applied to an off-road application. In an off-road setting, as the foot is loading the shoe at the same time a rock, root, or other foreign non-uniform object can load the shoe from the bottom, inside the shoe the plate which is sandwiched between two soft foams begins to shift under loads from different directions. With the plate being stiffer than the foams, the foams and the foot and body on the foam will be inclined to shear, thereby putting the body in a compromised position. Further, under extreme loads, such as a person walking or even jogging downhill (which increases the forces on impact) or if the person is carrying a load (e.g., a backpack), the plate is then at a less than ideal non-neutral angle which could promote instability to the point that a supination or rolling effect may occur with increased load and therefore speed, which may in turn may cause acute ankle or knee injuries such as ankle sprains. For these reasons, positioning the moderation plate closer to the foot, narrower and supported by a softer and wider foam is a safer option for off-road/trail use.

Further, positioning the moderation plate closer to the foot and away from the ground is especially advantageous when walking uphill with a substantial grade (e.g., greater than 5%). When walking uphill, for example, the apex of the moderation plate moves forward approximately 20 mm so the walker expends less effort before getting to this point. From that point on, the walker expends substantially less energy to maintain their position. Further, the moderation plate provides a stable platform extending from their heel to their toe, and the cushioning under the plate is confirming to the ground as opposed to the weight of the body. A moderation plate positioned closer to the ground, in contrast, hinders efficiency on hills, as the walker is forced to overcome the apex of the moderation plate earlier. Further, with the stiff moderation plate positioned closer to the ground, the shoe will tend to pivot from the point of contact down the hill so the walker has to do additional work to keep the shoe up and moving forward, while they sink into the soft midsole. Thus, for footwear articles intended for use on high-grade terrain, the moderation plate is preferably positioned as close to the foot as possible. For footwear articles intended for "urban" or flat use, wherein terrain is less graded and is more uniform, the plate may be positioned further away from the foot to increase cushioning and comfort. In some examples, the moderation plate may even be positioned in the midsole adjacent to the outer sole, and may be curved according to the constant curvature of the midsole and/or outer sole.

Further, in some embodiments, traction elements may be selectively positioned on an outsole of footwear articles provided herein according to a center-of-pressure line. As an example, FIG. 17 shows a diagram 1700 illustrating a center-of-pressure line 1717 along a foot 1715 relative to a midsole 1705 for selective placement of traction elements. The center-of-pressure line 1717 may be measured for the foot 1715 during walking without wearing a footwear article. In some examples, the curved midsole 1705 of the footwear articles described herein may shift the center-of-pressure line 1717. As such, the center-of-pressure may shift to a more medial center-of-pressure line 1720 or to a more lateral center-of-pressure line 1722, or may range between the center-of-pressure lines 1720 and 1722.

As mentioned above, traction elements may be selectively positioned along the average center-of-pressure line as typically exhibited during a stance phase while walking. Other traction elements are positioned in plantar areas where necessary and sufficient for traction, for example in the heel strike and toe-off areas. The placement of traction elements along the center-of-pressure line optimizes traction along the force transfer path and implements traction only where necessary, thereby increasing efficiency of walking and also reducing weight of the footwear article, thereby further reducing energy expenditure while walking.

The center-of-pressure line 1717 may further be utilized to minimize the amount of material in the midsole 1705. As an illustrative example, FIG. 18 shows a side lateral view of a footwear article 1800 with a curved midsole 1805 with minimized materials according to a center-of-pressure line. In particular, the midsole 1805 includes a cavity 1812 positioned along a midsection of the footwear article 1800 and away from the center-of-pressure line. In this way, the overall weight of the midsole 1805, and thus the footwear article 1800, is reduced, thereby minimizing energy expenditure while walking and in turn reducing fatigue during walking.

By constructing the upper 1810 from minimal weight materials, such as a 3D knitted upper with an incorporated minimal tongue and fusible material to achieve desired zonal stiffness by heat pressing, the weight of the footwear article 1800 is further reduced. Further, the midsole 1805 may be constructed from low density phylon, with blown rubber utilized for the outsole, and the moderation plate included in the midsole 1805 may be constructed from low density/stiffness ratio materials such as carbon fiber or reinforced nylon to further reduce the weight of the footwear article 1800.

In this way, the footwear article 1800 and other footwear articles described herein are constructed with a minimum yet sufficient number of components, with materials and construction techniques to achieve minimal possible weight, thus helping with minimization of energy expenditure while walking.

In some examples, the curvature of the midsole may extend through both the sagittal and the coronal plane. For example, rather than curving the midsole along the sagittal plane (i.e., from heel to toe) as described hereinabove with regard to FIG. 3, the curvature may extend along the center-of-pressure line. As an illustrative example, FIG. 19 shows a diagram 1900 illustrating a rotation of curvature of a curved midsole relative to the center-of-pressure line 1904 of a foot 1902. As depicted, a cylinder 1910 has a central axis 1912 of the cylinder 1910 centered on the foot 1902 and that is aligned with a longitudinal axis of the foot 1902. The cylinder 1910 corresponds to the cylinder 340 described hereinabove with regard to FIG. 3, such that the curvature defined by the cylinder 1910 extends along the longitudinal axis of the foot 1902.

In some examples, the curvature may be instead defined by a cylinder such as cylinder 1920, which is rotated such that the central axis 1922 of the cylinder 1920 is rotated by an angle 1918 with respect to the central axis 1912 of the cylinder 1910, or similarly with respect to the longitudinal axis of the foot 1902. The angle 1918, as depicted, is selected such that the central axis 1922 is generally fit to the center-of-pressure line 1904 of the foot 1902. By defining the curvature of the midsole according to the cylinder 1910 rotated by the angle 1918, the rolling motion from heel strike to toe off during walking is further refined such that the trajectory of the center of motion of a person wearing the footwear article is smoother. It should be appreciated that in such examples, the geometric profile of the moderation plate contained with the midsole of the footwear article may be adjusted to accommodate the curvature of the midsole angled away from the longitudinal axis or the sagittal plane.

In some examples, the constant curvature of the midsole may be asymmetric. For example, to address pronation issues, the curvature may be offset such that the constant curvature on the lateral side of the midsole is greater than the constant curvature on the medial side of the midsole, or vice versa. For example, the medial side of the midsole may have a constant curvature of 410 or 420 mm, while the lateral side of the midsole may have a constant curvature of 400 mm.

Thus, in one embodiment, a footwear article comprises a midsole with a lower surface of constant curvature extending from a heel of the midsole to a toe of the midsole wherein the lower surface maintains the constant curvature throughout a stance phase of a walking gait.

In a first example of the footwear article, the footwear article further comprises a moderation plate positioned within a cavity of the midsole towards an upper surface of the midsole. In a second example of the footwear article optionally including the first example, the moderation plate includes curvature such that the curvature is positioned adjacent to a ball of a foot inserted into an upper of the footwear article. In a third example of the footwear article optionally including one or more of the first and second examples, the moderation plate is inflexible. In a fourth example of the footwear article optionally including one or more of the first through third examples, the heel of the midsole extends outward from a heel of a foot inserted into an upper of the footwear article. In a fifth example of the footwear article optionally including one or more of the first through fourth examples, the midsole is constructed of rigid material such that the constant curvature of the midsole does not deform during a stance phase of walking. In a sixth example of the footwear article optionally including one or more of the first through fifth examples, a plane of the constant curvature aligns with a center-of-pressure line of a foot inserted into an upper of the footwear article. In a seventh example of the footwear article optionally including one or more of the first through sixth examples, the footwear article further comprises a cavity in the midsole away from the center-of-pressure line. In an eighth example of the footwear article optionally including one or more of the first through seventh examples, the footwear article further comprises traction elements on an outsole coupled to the lower surface of the midsole, the traction elements selectively positioned along a center-of-pressure line of a foot inserted into an upper of the footwear article. In a ninth example of the footwear article optionally including one or more of the first through eighth examples, the footwear article further comprises an upper coupled to the midsole. In a tenth example of the footwear article optionally including one or more of the first through ninth examples, the upper comprise a first upper component and a second upper component, the first upper component coupled to the midsole and of a first flexibility, the second upper component coupled to the first upper component and of a second flexibility greater than the first flexibility. In an eleventh example of the footwear article optionally including one or more of the first through tenth examples, the second upper component defines a rim through which a foot is inserted into the footwear article. In a twelfth example of the footwear article optionally including one or more of the first through eleventh examples, the footwear article further comprises a lace cord, wherein the second upper component includes a plurality of lace bights through which the lace cord is laced. In a thirteenth example of the footwear article optionally including one or more of the first through twelfth examples, a radius of the constant curvature ranges from 300 mm to 550 mm.

In another embodiment, a footwear article comprises an upper, a midsole coupled to the upper, wherein a bottom surface of the midsole includes a constant curvature extending from a heel of the midsole to a toe of the midsole, a moderation plate positioned within the midsole at an upper surface of the midsole, and a sole coupled to the bottom surface of the midsole, the sole comprising a plurality of traction elements selectively positioned along a strike axis of the footwear article.

In a first example of the footwear article, a plane of the constant curvature extends along the strike axis. In a second example of the footwear article optionally including the first example, a heel of the midsole extends a specified length from a heel of the upper. In a third example of the footwear article, the moderation plate is inflexible, the midsole is rigid, and the upper comprises a knitted upper conformable to a foot positioned within the upper.

In yet another embodiment, a midsole for a footwear article comprises at least one rigid material forming a bottom surface with a constant curvature from a heel to a toe of the midsole, the constant curvature extending away from a relatively flat top surface.

In a first example of the midsole, a distance from the top surface to the bottom surface at the toe is a first distance, a distance from the top surface to the bottom surface at a central position of the midsole is a second distance, and a distance from the top surface to the bottom surface at the heel is a third distance, wherein the second distance is greater than the first distance and the third distance. In a second example of the midsole, the third distance is greater than the second distance.

In addition to the first and second example moderation plates described above, moderation plates having different geometries may be incorporated into midsoles/footwear articles as described herein below. The moderation plates may preserve the shape of the footwear midsole during specific activities (walking, running, etc.) and provide added stability during activities and in many directions, i.e. medio-lateral, land-to-toe off etc. The moderation plates described herein may minimize dissipation of energy that might occur at several articulation joints, such as the metatarsal joint. The moderation plates may provide a suspension mechanism for comfort and smooth ride during gait. The geometry of each of the different moderation plates is constructed taking into consideration landmarks of the foot anatomy and the foot last, such as the metatarsal joint, the ball of the last, etc. The moderation plates may have several shapes: curved, flat, S-shaped, wavy, and/or have flanges and protuberances. In some examples, one or more of the moderation plates may be configured (e.g., shaped) to follow a curvature of the midsole of the foot of the wearer in one or more planes, which may provide support and/or dynamic load dispersal specifically configured for walking. The plates can be curved in a variety of shapes with center of curvature along any of all anatomical direction planes. For example, the S-shaped plate has a center of curvature in the sagittal plane. The plates may be positioned at different heights in the midsole for different purposes. For example, a plate may be positioned against the foot (e.g., flush with the midsole top) primarily for biomechanics purposes and energy conservation, against the outsole (e.g., flush with the bottom of the midsole) to preserve midsole profile geometry during gait, and/or at different heights between the top and bottom midsole planes to achieve specific benefits of energy conservation and midsole geometry preservation and to minimize dissipation of energy. The plates described herein can be made of a variety of materials: composite material such as a reinforced plastic or carbon fiber.

The moderation plates described herein may be configured to provide improved stability in the medial and lateral planes while also providing increased cushion and propulsion during walking. To accomplish this, the walking gait may be divided into three phases: heel, midfoot, and toe-off, and the moderation plates may be configured with 2D or 3D zones corresponding to these three phases, as will be described in more detail below. Accordingly, the moderation plates may extend under the midfoot region of a wearer of a footwear article and may extend toward the toes and the heel of the wearer. Each moderation plate may be positioned in the center of the footwear article and extend past the known peak pressure zones of the heel and into lesser loaded areas, as explained above.

The moderation plates described herein may provide stability and cushioning that may alleviate the need to use multiple different foams/foam densities in the midsole in which the moderation plate is incorporated. As such, the footwear articles may be manufactured with single density foam midsoles, which may allow the moderation plates be incorporated into footwear articles using a streamlined/common injection molding process that may allow for different moderation plates to be incorporated into the same footwear article model. As will be explained in more detail below, the moderation plates may be held in place during manufacture via a set of retaining element receptors configured to accommodate direct, localized retaining elements on the moderation plates, such as pins, that may secure the moderation plates to a mold. The retaining element receptors may be positioned in the same location on multiple different moderation plates, which may further increase the ease of manufacturing. The position of the moderation plates within the midsole (e.g., whether closer to or farther from the foot) may be controlled at least in part by the retaining element receptors and the direct, localized retaining elements. For example, to positon a moderation plate closer to the outsole and farther from the foot, shorter retaining elements may be used and/or more retaining elements may be used. To position a moderation plate closer to the foot and farther from the outsole, longer retaining elements may be used and/or fewer retaining elements may be used. In the regions of the moderation plate where the retaining element receptors are located, the thickness of the midsole under the moderation plate may be relatively thin, e.g., the thinnest region(s) of the midsole under the moderation plate.

Example moderation plates that may be incorporated in a midsole using direct, localized retaining elements are described below.

FIGS. 20-24 illustrate a fourth example moderation plate that may be incorporated into a footwear article, referred to herein as a D-plate 2010. The D-plate 2010 may be referred to as such due to the plate having an overall shape that mimics the letter D due to the moderation plate having points in the same plane as the outsole/bottom of the midsole and also having regions that curve upward and are elevated above the outsole. The D-plate 2010 may be incorporated into a midsole of a footwear article in order to help preserve the shape of the footwear midsole during locomotion, such as running or walking, provide stability when moving or flexing a foot in multiple directions, minimize and conserve energy, and act as a suspension mechanism to increase comfort when worn. The components of the D-plate 2010 may be formed from the same material. The material of the D-plate 2010 may be made of any suitable material to achieve optimal and/or required range of stiffness, such as a plastic or composite. The D-plate 2010 as well as other moderation plates described further below (e.g., the A-plate 2510 of FIG. 25, C-plate 2610 of FIG. 26, and B-plate 2710 of FIG. 27), may be manufactured by cutting a piece of material to form an overall shape, bending the material in one or more areas to form elevated surfaces/regions, and at least in some examples, laser cutting one or more regions of material to form webbing. However, other methods of forming the moderation plates are within the scope of this disclosure.

The D-plate provides a comprehensive approach to plate and midsole structure configuration that takes in account the different phase of the gait cycles for given activates. The matrix approach breaks the phases of the gait down into three distinct phases: heel, midfoot, and toe-off. Additionally, it takes into account the lateral and medial forces created by non-uniform surfaces. The D-plate thus includes 3D zones created in these three areas which is key as the 2D plates move from simple plates to 3D structures providing more than simply rigidity, or propulsion, but also much improved stability and especially in the medial and lateral planes. Additionally, the D-plate may provide increased cushion and propulsion.

Furthermore, the concept provides additional manufacturing advantages as the D-plate itself can provide stability to a simply designed, single density sole where previously a multi density sole would be used. The same advantages can be applied to cushion where the plate can provide cushion in place of a second density.

Figure 20:
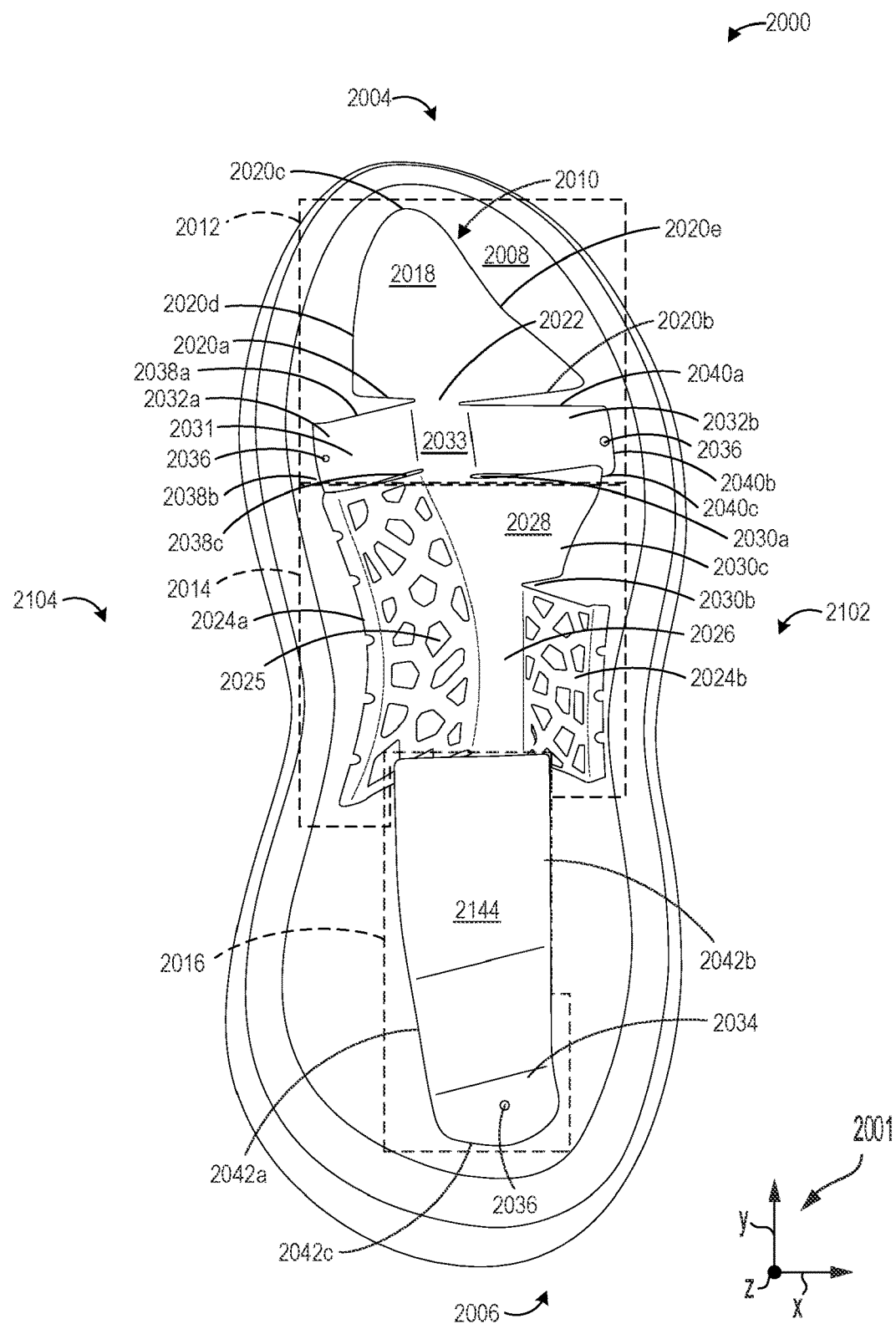
FIG. 20 shows a top view of a fourth example moderation plate coupled to an outsole.

FIGS. 20-24 illustrate the D-plate 2010 from a variety of angles and viewpoints. As an illustrative example, FIG. 20 shows a top view 2000 of the D-plate 2010 coupled to an outsole 2008, with the D-plate 2010 and outsole 2008 specifically configured to be incorporated into a footwear article for a right foot. Relative to the outsole 2008 and D-plate 2010 are a toe side 2004, a heel side 2006, a lateral side 2102, and a medial side 2104. The D-plate 2010 is comprised of three regions: a toe-off section 2012, a midfoot section 2014, and a heel section 2016. The toe-off section 2012, the midfoot section 2014, and the heel section 2016 create a three dimensional structure as opposed to approximately two dimensional structures of many conventional plates.

The D-plate 2010 provides stability both from heel to toe and in the lateral plane. It offers rigidity from heel to toe through an extended heel and full length plate. In the midfoot and/or forefoot, the D-plate has "outrigger" like elements that may provide a perception of increased propulsion as the outriggers extend from the weighted part of the plate to the ground providing an almost trampoline like effect in the midfoot and/or forefoot.

The D-plate may be incorporated into a midsole of a footwear article having an upper coupled to the midsole (e.g., at a top of the midsole) and an outsole coupled to the midsole (e.g., at a bottom of the midsole). The D-plate may include a toe-off section, a heel section, and a midfoot section positioned intermediate the toe-off section and the heel section. The midfoot section may include at least one an outrigger web that comprises a plurality of openings, e.g., within a segment of material. The outrigger web may act as a spring to absorb downward forces and provide a corresponding upward force during locomotion.

The D-plate includes a center-of-pressure support that is configured to align with a center-of-pressure line of a foot of a wearer of the footwear article. The center-of-pressure support is formed from aspects of each of the heel section, the midfoot section, and the toe-off section and is elevated above the bottom of the midsole (such as proximate to the top of the midsole and/or forming parts of the top of the midsole). For example, the midfoot section includes a center support positioned along a top of the midsole that forms part of the center-of-pressure support, and the outrigger web(s) extends from the center support to a bottom of the midsole.

The heel section includes a heel support that forms part of the center-of-pressure support, where the heel support is coupled to the center support and extends along the top surface of the midsole. The heel section may further include a heel coupling region extending along the bottom of the midsole, and an incline region coupling the heel support to the heel coupling region.

The toe-off section includes a toe support coupled to a joint support, and each of the toe support and joint support forms a part of the center-of-pressure support. The joint support may include a medial side region and a lateral side region each extending below a center area of the joint support, the center area coupled to the center support and to the toe support. The heel coupling region, the medial side region, and the lateral side region may each be coupled to the outsole.

In the example shown herein, the D-plate includes two outrigger webs: a first outrigger web and a second outrigger web, each extending from the center support to the bottom of the midsole, with the first outrigger web positioned on a medial side of the D-plate and the second outrigger web positioned on a lateral side of the D-plate.

A set of reference axes 2001 is provided for comparison between views shown in FIG. 20-29B. The reference axes 2001 indicate a y-axis, an x-axis, and a z-axis. In the examples shown, the z-axis may be parallel with a direction of gravity and the x-y plane may be parallel with a horizontal plane that the D-plate 2010 or other plates and/or outsole 2008 may rest upon. When referencing direction, positive may refer to in the direction of the arrow of the y-axis, x-axis, and z-axis and negative may refer to in the opposite direction of the arrow of the y-axis, x-axis, and z-axis. Arrows that extend toward (e.g., negative to) a view are represented by a circular dot. Arrows that extend away from (e.g., negative to) a view are represented by a circular ring.

The toe-off section 2012 is comprised of a toe support 2018 and a metatarsal joint support 2031 (also referred to as a joint support). The toe support 2018 has a first straight edge 2020a, a second straight edge 2020b, a first tip 2020c, a first side edge 2020d, and a second side edge 2020e. The first straight edge 2020a is approximately linear and extends from a plate bridge 2022 to the medial side 2104. The second straight edge 2020b is approximately linear and extends from the plate bridge 2022 to the lateral side 2102. The first tip 2020c may be rounded and have a suitable curvature, such as a curve between 90 and 45 degrees. The first side edge 2020d and second side edge 2020e extend from the first tip 2020c. The first side edge 2020d may extend toward medial side 2104 and the second side edge 2020e may extend toward the lateral side 2102. The first side edge 2020d may curve in a manner resembling a second order polynomial while the second side edge 2020e may curve in a manner resembling a third order polynomial. Due to the length and curvature of edges 2020a, 2020b, 2020d, 2020e and the first tip 2020c, the toe support 2018 may be shaped as an offset spade, which may mimic the overall shape of the toes.

The joint support 2031 of the toe-off section 2012 includes a first coupling area 2032a (also referred to as a medial side region), a second coupling area 2032b (also referred to as a lateral side region), and a center area 2033 intermediate the first and second coupling areas. The first coupling area 2032a and the second coupling area 2032b each act as coupling points where the D-plate couples to the outsole, as each side area is coupled to the outsole 2008 via a respective pin. The first coupling area 2032a extends toward the medial side 2104 and the second coupling area 2032b extends toward the lateral side 2102 from a plate bridge 2022. The first coupling area 2032a may be formed from a first edge 2038a, a second edge 2038b, and a third edge 2038c. Likewise, the second coupling area 2032b may be formed from a first edge 2040a, a second edge 2040b, and a third edge 2040c. Edges 2038a, 2038b, 2040a, 2040b are approximately linear, while third edges 2038c, 2040c are curved of a smaller degree than the first tip 2020c and third edge 2030c. Therein, the first and second coupling areas 2032a, 2032b have rectangular shapes. The center area 2033 may be coupled to the toe support 2018 via a plate bridge 2022 and may extend to the midfoot section 2014 described below.

The midfoot section 2014 may be comprised of a first outrigger web 2024a, a second outrigger web 2024b, a center pressure support 2026, and a second area 2028. When incorporated into the midsole of a footwear article, the center pressure support 2026 may align with a center-of-pressure line of a foot, such as center-of-pressure line 1717 and 1904. The first and second outrigger webs 2024a, 2024b may each include a respective segment of webbed material that extends from the center pressure support 2026 to a respective bottom coupling surface that is positioned proximate the surface of the outsole 2008. The first and second outrigger webs 2024a, 2024b may provide a more elastic support for the foot compared to other components of the D-plate 2010 allowing for the D-plate to be partially compressed downward (e.g., the negative z direction) while also providing a spring like resistance upward (e.g., in the positive z direction) against the foot of a user. The resistance provided by the first and second outrigger webs 2024a, 2024b may slow and reduce the perception of force of the foot of a user against the outsole 2008 and a surface, such as a floor, the outsole 2008 contacts.

The first outrigger web 2024a may be larger and extend further in a positive y direction toward the toe side 2004 compared to the second outrigger web 2024b. The first and second outrigger webs 2024a, 2024b include respective segments of webbed material comprised of a plurality of holes 2025. In the example shown herein, the holes 2025 may be unevenly distributed and may have various different symmetrical and asymmetrical shapes and areas. The holes 2025 may range in size, such having a length (e.g., a longitudinal diameter) of 1 mm-10 mm and a width (e.g., opposite the length) of 1 mm-10 mm. The holes 2025 may reduce the weight and provide resilience (e.g., a spring-like mechanism) to outrigger webs 2024a, 2024b. The first and second outrigger webs 2024a, 2024b are formed of the same material as the rest of the D-plate 2010.

The second area 2028 may also extend from the center pressure support 2026 and be located on the same side as the second outrigger web 2024b. The second area 2028 may have a first edge 2030a and a second edge 2030b that are approximately straight. The second area 2028 may also have a third edge 2030c that is curved with an approximately polynomial shape. The second area 2028 may help to support regions of a foot subject to less pressure, such as the lateral side phalanges and metatarsal joints.

The heel section 2016 may support the heel of a foot. The heel section 2016 comprises a heel support 2144, an incline region 2142, and a heel coupling region 2034 that includes a coupling point for coupling the heel section to the outsole. The heel coupling region 2034 couples the heel section 2016 to the outsole 2008. The heel coupling region may be formed by a first edge 2042a, a second edge 2042b, and a third edge 2042c, as well as the border of an incline (e.g., incline region 2142 of FIG. 21-24). Third edge 2042c is located near the heel side 2006 where, for example, an axis extending parallel to the x-axis is tangential to third edge 2042c. Third edge 2042c is rounded with a curvature with a degree lesser than first side edge 2020d and second side edge 2020e of the toe support 2018. First and second edges 2042a, 2042b are less curved and more linear compared to third edge 2042c. First edge 2042a may be located closest toward the medial side 2104 and second edge 2042b may be located closest to lateral side 2102. The third edge 2042c is curved to a greater degree compared to the first and second edges 2042a, 2042b.

The first coupling area 2032a (e.g., the medial side of the joint support), the second coupling area 2032b (e.g., the lateral side of the joint support), and the heel coupling region 2034 may couple the D-plate 2010 to the outsole 2008 of a footwear article, via retaining element receptors 2036. The retaining element receptors 2036 may comprise apertures configured to accommodate retaining elements such as pins that extend downward from a bottom surface of the D-plate. The retaining elements may act to hold the moderation plate in position during manufacture of the midsole (e.g., the midsole may be formed around the moderation plate via injection molding and the retaining elements may couple to a mold used to form the midsole). However, it is to be appreciated that the position and amount of retaining element receptors may be non-limiting and other configurations for positioning the plates within the midsole described herein may be used without departing from the scope of this disclosure (e.g., staples, adhesive, etc.). In some examples, the D-plate 2010 may include through-holes and the retaining elements (e.g., pins) may be positioned within the through-holes and coupled to the mold during manufacture of the footwear article. In such examples, the retaining elements may have a flat upper surface that may have a larger diameter than the diameter of the through-holes to act as a stop and maintain the retaining elements in position. Further, the retaining element receptors may provide localized direct or indirect coupling between the D-plate and the outsole, such that the outsole, once coupled to the midsole is indirectly coupled to the D-plate with a thin layer of midsole between the D-plate at the region(s) of the D-plate where the retaining element receptors are located. In some examples, the outsole may be directly coupled to the D-plate only via the regions where the retaining element receptors are located. In either example, the direct or indirect coupling does not extend the full length or width of the D-plate and the thickness of the midsole under the D-plate may vary across the D-plate.

Figure 21:
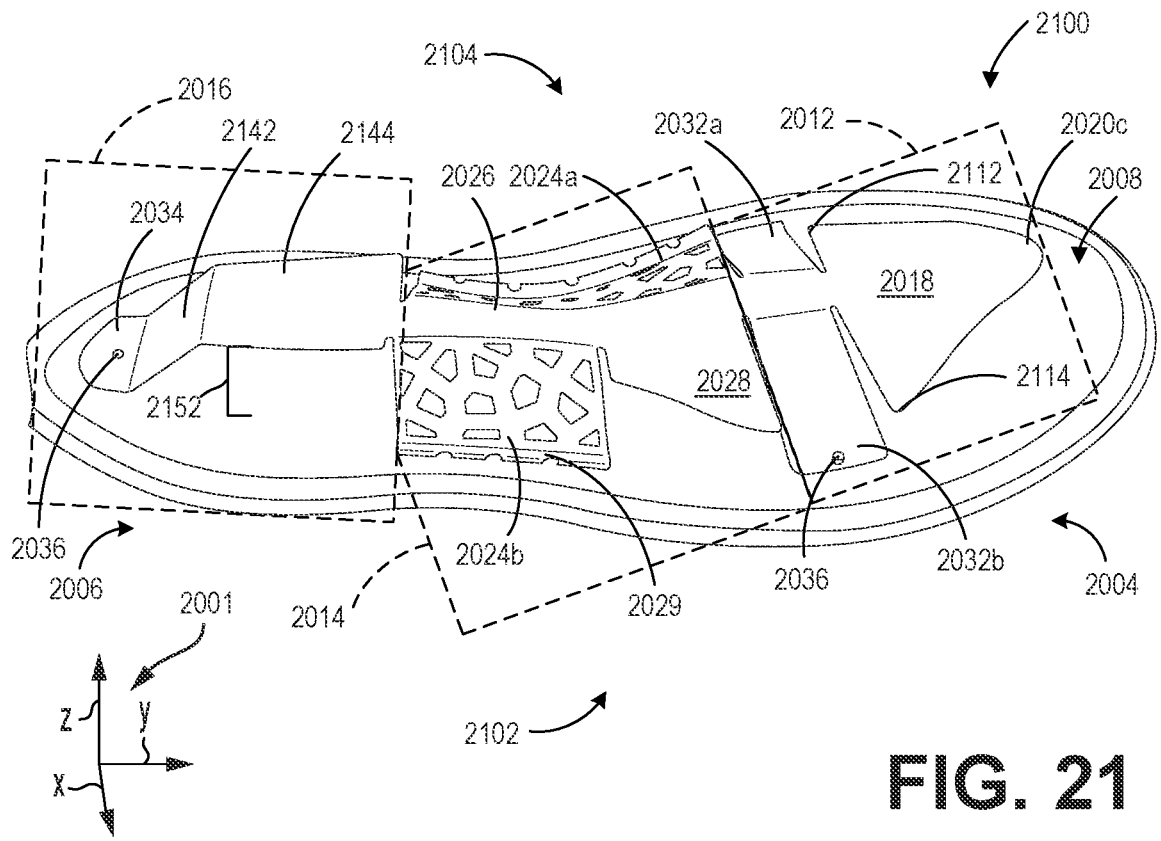
FIG. 21 shows an isometric view from the lateral side of the fourth example moderation plate coupled to the outsole.
Figure 22:
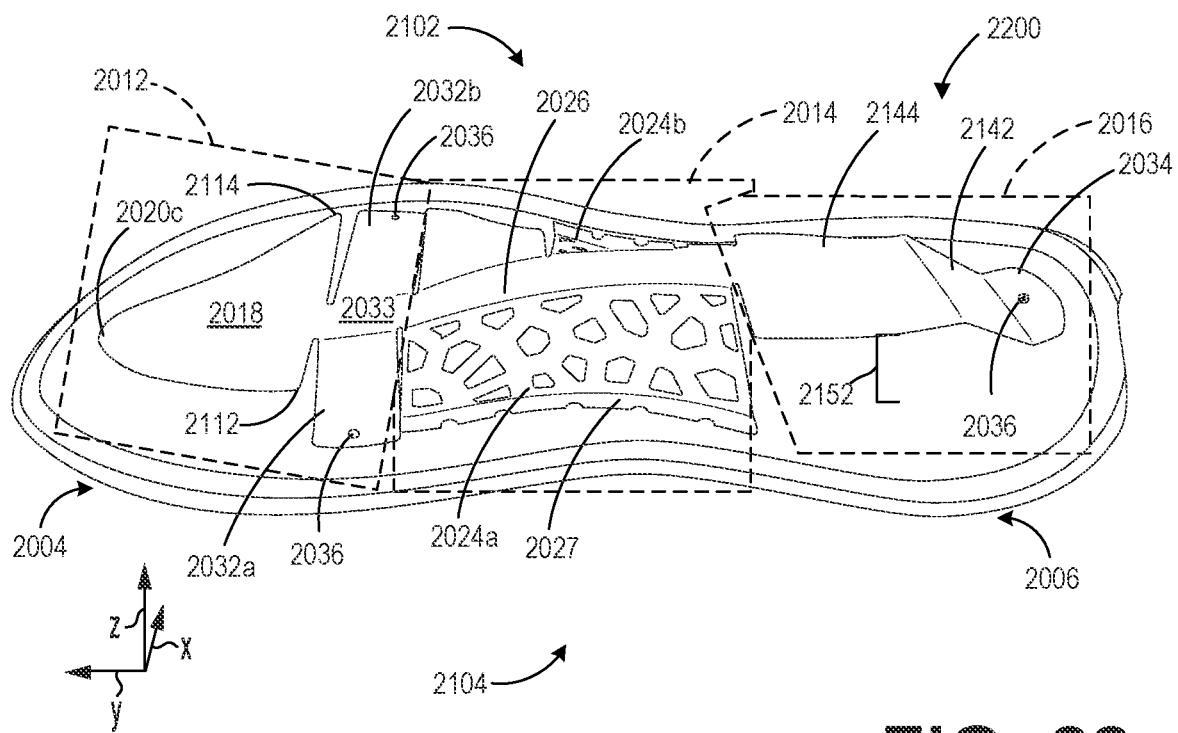
FIG. 22 shows an isometric view from the medial side of the fourth example moderation plate coupled to the outsole.

FIGS. 21 and 22 show additional details of the D-plate 2010 from a first isometric perspective 2100 and a second isometric perspective 2200, wherein the first isometric perspective 2100 shows the lateral side 2102 and the second isometric perspective 2200 shows the medial side 2104.

As shown in FIG. 21 and FIG. 22, the toe support 2018 of the toe-off section 2012 includes the first tip 2020c, and further includes a second tip 2112 and a third tip 2114 each of which may be positioned a greater distance above the outsole 2008 than the center of the toe support 2018. The first tip 2020c is located closest to the toe side 2004, the second tip 2112 is located toward the medial side 2104, and the third tip 2114 is located closest to the lateral side 2102.

The heel section 2016 includes the incline region 2142, which may be angled at an incline greater than 30 degrees and bridge the heel support 2144 to the heel coupling region 2034. The heel support 2144 may be approximately flat and positioned above the outsole 2008 at a distance 2152. The distance 2152 may be approximately constant across the heel support 2144.

As further appreciated by FIGS. 21 and 22, each of the first and second outrigger webs 2024a, 2024b may have a bottom coupling surface that extends in the x-y plane and is positioned in face-sharing contact with the outsole 2008 and/or positioned a short distance above the outsole 2008 (e.g., within 0.5-2 mm of the outsole). For example, the first outrigger web 2024a may include a first bottom coupling surface 2027 and the second outrigger web 2024b may include a second bottom coupling surface 2029. Neither the first bottom coupling surface 2027 nor the second bottom coupling surface 2029 is fixed to the outsole but the shape of the first outrigger web 2024a and the second outrigger web 2024b may maintain the first bottom coupling surface 2027 and the second bottom coupling surface 2029 in positon on and/or above the outsole.

Figure 23:
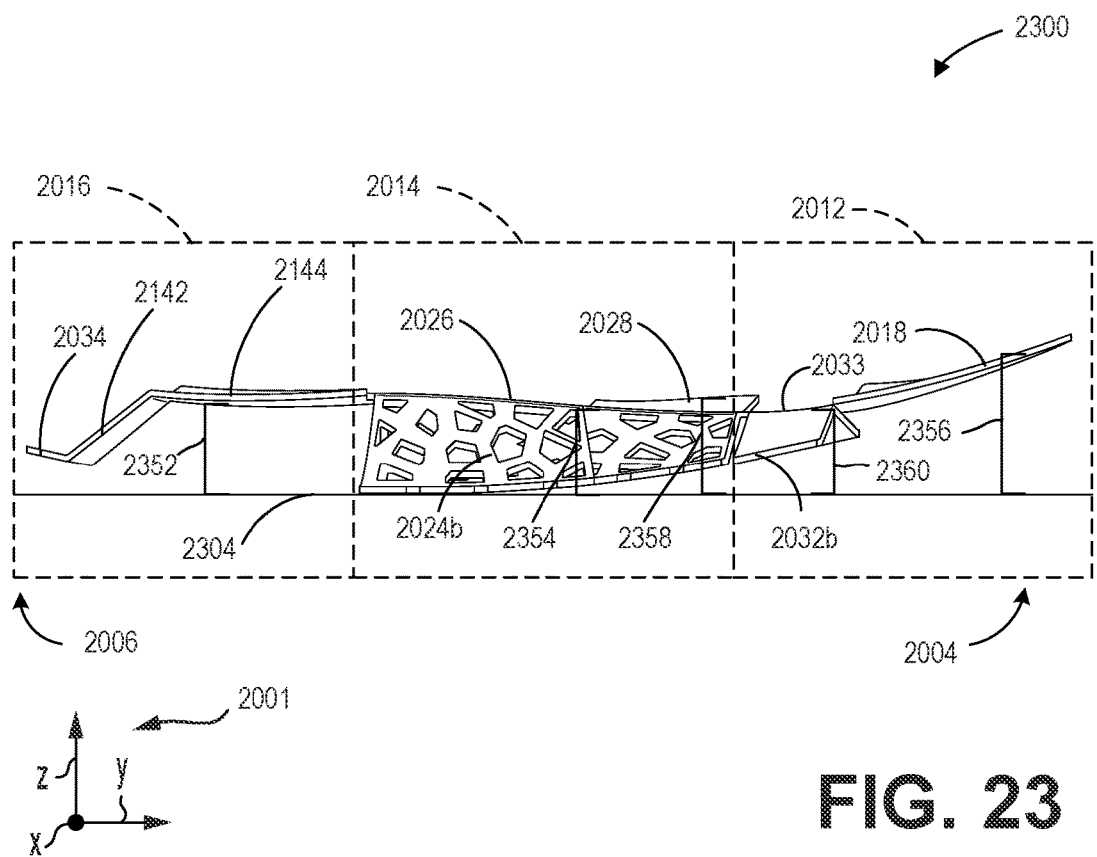
FIG. 23 shows a side lateral view of the fourth example moderation plate from FIG. 20.
Figure 24:
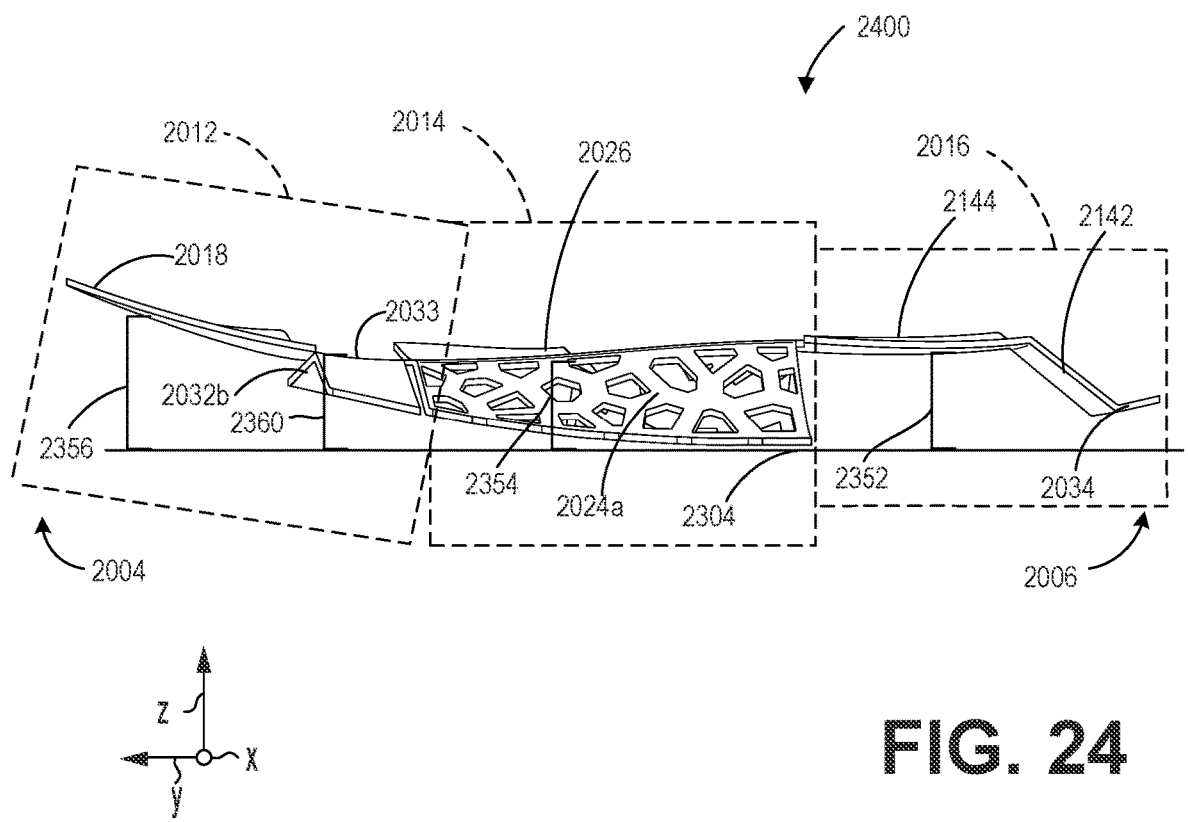
FIG. 24 shows a side medial view of the fourth example moderation plate from FIG. 20.

FIG. 23 shows a first side isolated view 2300 of the D-plate 2010 from the lateral side 2102. FIG. 24 shows a second side isolated view 2400 of the D-plate 2010 from the medial side 2104. The D-plate 2010 in FIGS. 23-24 may be resting upon a flat surface 2304.

The D-plate 2010 has a curved shape compared to the flat surface 2304. The outsole 2008 may be curved or partially curved, and when the midsole is coupled to the outsole and the D-plate is integrated in the midsole, the midsole may likewise be curved or partially curved (similar to midsole 302 or midsole 610). As a result, the heel coupling region 2034 may extend in the negative direction of y-axis and positive direction of z-axis at an angle compared to the flat surface 2304, so the heel coupling region 2034 may be complimentary to the curvature of the outsole 2008 and may contact or be in near contact of the top surface of the outsole 2008 (e.g., within 1 mm of the top surface of the outsole). Likewise, the first and second coupling areas 2032a, 2032b may curve in the positive z direction toward the toe side 2004 similar to the curve of the inner surface of the outsole 2008.

Each of the heel support 2144, the center pressure support 2026, the second area 2028, the plate bridge 2022, the center area 2033, and the toe support 2018 may be elevated above the flat surface 2304. Because the D-plate is curved to match a curvature of the outsole and/or midsole, at least some of the elevated sections of the D-plate may be elevated above the flat surface by amounts that change along the x and/or y axes. The heel support 2144 may be located above the flat surface 2304 at a distance 2352, which may be substantially constant across the heel support. Distance 2352 may be similar to distance 2152. The center pressure support 2026 of the midfoot section 2014 may be positioned at a distance 2354 above the flat surface 2304. The distance 2354 may not be constant (e.g., the distance may vary in size) and may decrease from the heel side of the center pressure support to the toe side of the center pressure support, wherein distance 2354 may be similar in size to distance 2152 near the heel side 2006 and similar in size to a distance 2358 near the toe side.

The toe support 2018 may be located above the flat surface 2304 at a distance 2356. The toe support 2018 may curve upward toward the toe side 2004 of the D-plate 2010. Therein, the distance 2356 increases to a maximum near the first tip 2020c, the second tip 2112, and the third tip 2114.

The second area 2028 may be located above the flat surface 2304 at a distance 2358. The toe support 2018 may curve upward toward closer to the toe side 2004 of the D-plate 2010, therein increasing distance 2358 to a maximum near the first edge 2030a.

The center area 2033 may be located above the flat surface 2304 at a distance 2360. The distance 2360 may increase as the center area 2033 extends toward the toe side 2004 and curves upward in the positive y-direction.

Thus, the D-plate shown in FIGS. 20-24 may be a moderation plate that includes three main regions that each correspond to a different phase of a gait, e.g., a toe-off section, a midfoot section, and a heel section. The D-plate may extend along a majority of the longitudinal axis of the outsole, such as 60-95% of the length of the outsole (in some examples, the D-plate may extend 80-95% of the length of the outsole to provide support in both the toe-off and the heel sections). The D-plate may have an overall shape that mimics the shape of the foot, but with cutouts and webbing to allow various sections to flex and move independently as well as be positioned closer to or farther from the top of the midsole.

The toe-off section may have a shape that resembles the shape of the toes (e.g., a curve that peaks on the medial side and extends back in a more gradual manner toward the lateral side). The toe-off section may have a main area, referred to as a toe support, that is elevated above the outsole and a joint support that is coupled to the outsole on the medial and lateral sides. The toe-off section may include two cutouts that allow the toe support to be coupled to the joint support while still allowing the toe support to be elevated above the outsole and flex and move relative to the joint support.

The midfoot section may include two outrigger webs and a side area that extend out and downward from a center pressure support. One outrigger web (e.g., on the medial side) may extend the entire length of the midfoot section and the other outrigger web (e.g., on the lateral side) may extend partially along the length of the midfoot section, with the side area extending the remaining length of the midfoot section. The outrigger webs may each be formed from a respective segment of webbed material (e.g., including a plurality of openings) that extends downward and outward from the center pressure support at an angle that is not parallel to the vertical axis (e.g., at an angle between the vertical axis and the horizontal axis, such as 30 degrees, 45 degrees, etc.). Each segment of webbed material may terminate at a respective bottom coupling surface configured to be positioned on or just above the outsole.

The heel section may include a relatively flat, elevated section (referred to as the heel support), a coupling area that is coupled to the outsole, and an incline region that couples the coupling area to the plateau surface.

The D-plate may include a center-of-pressure support that spans the toe-off section, the midfoot section, and the heel section. For example, the center-of-pressure support may be formed by the heel support 2144 (of the heel section), the center pressure support 2026 (of the midfoot section), and the center area 2033, the plate bridge 2022, and the toe support 2018 (each of the toe-off section). The center-of-pressure support may be elevated above the bottom of the midsole and may be configured to align with a center-of-pressure line of a foot of a wearer of the footwear article in which the D-plate is incorporated. The center-of-pressure support may curve in one or more directions in order to have an overall curvature that matches a curvature of the top of the midsole.

The D-plate may be integrated into a midsole via an injection molding process whereby the D-plate is coupled to a midsole mold as described herein and the midsole is injection molded around the D-plate using the midsole mold. The midsole may be formed from a single density foam. The D-plate may provide support and cushioning that obviates the need for more than one density foam in the midsole. The retaining elements with which the D-plate is coupled to the mold may be minimal (e.g., three) and may be positioned similarly to the positioning of the retaining elements of other moderation plates. As a result, footwear articles including the D-plate may be manufactured with the same equipment (e.g., midsole mold) as footwear articles including other types of moderation plates, which may allow different moderation plates to be included in the same model of footwear article without requiring different manufacturing equipment.

Figure 25:
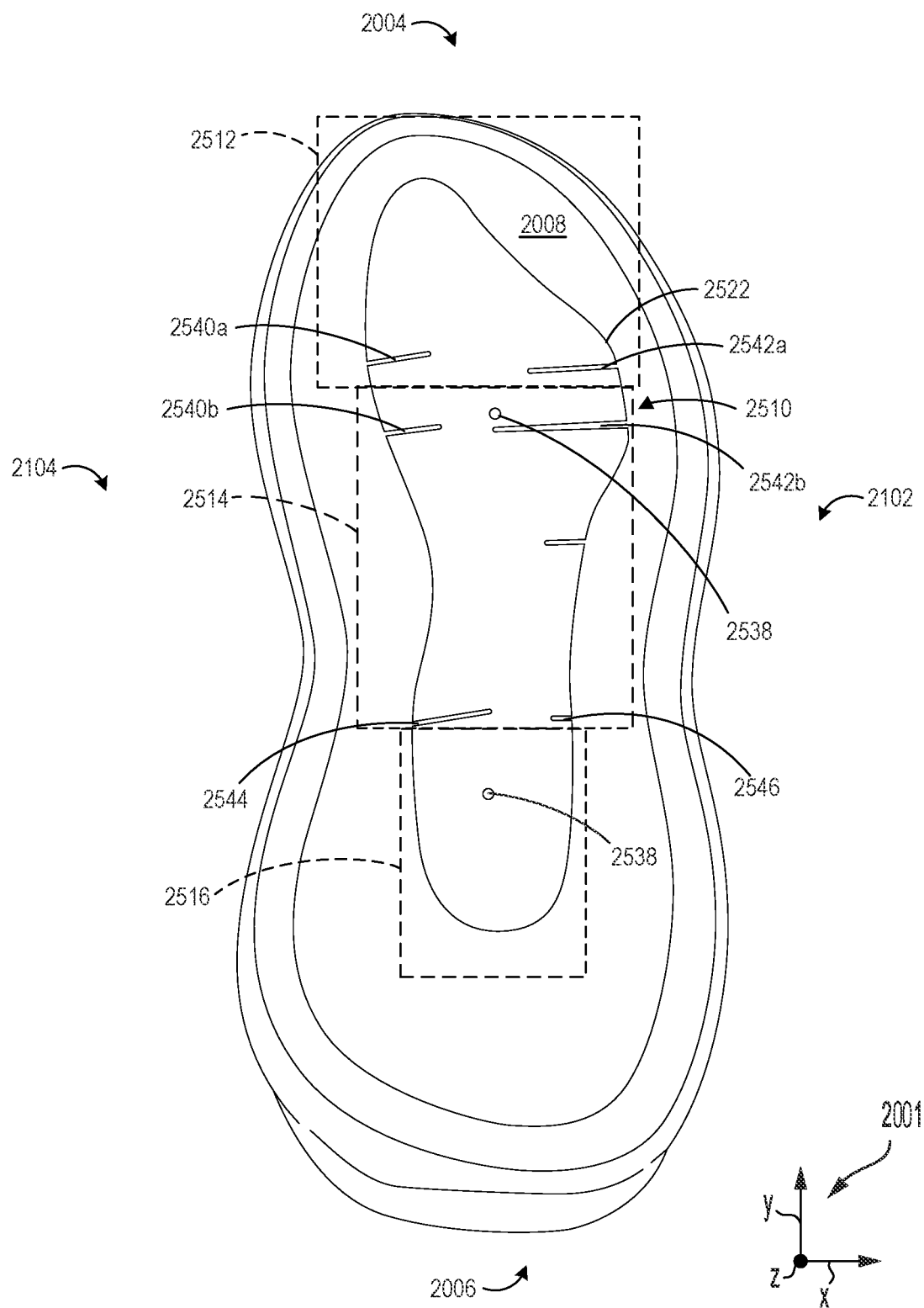
FIG. 25 shows a top view of a fifth example moderation plate coupled to an outsole.
Figure 26:
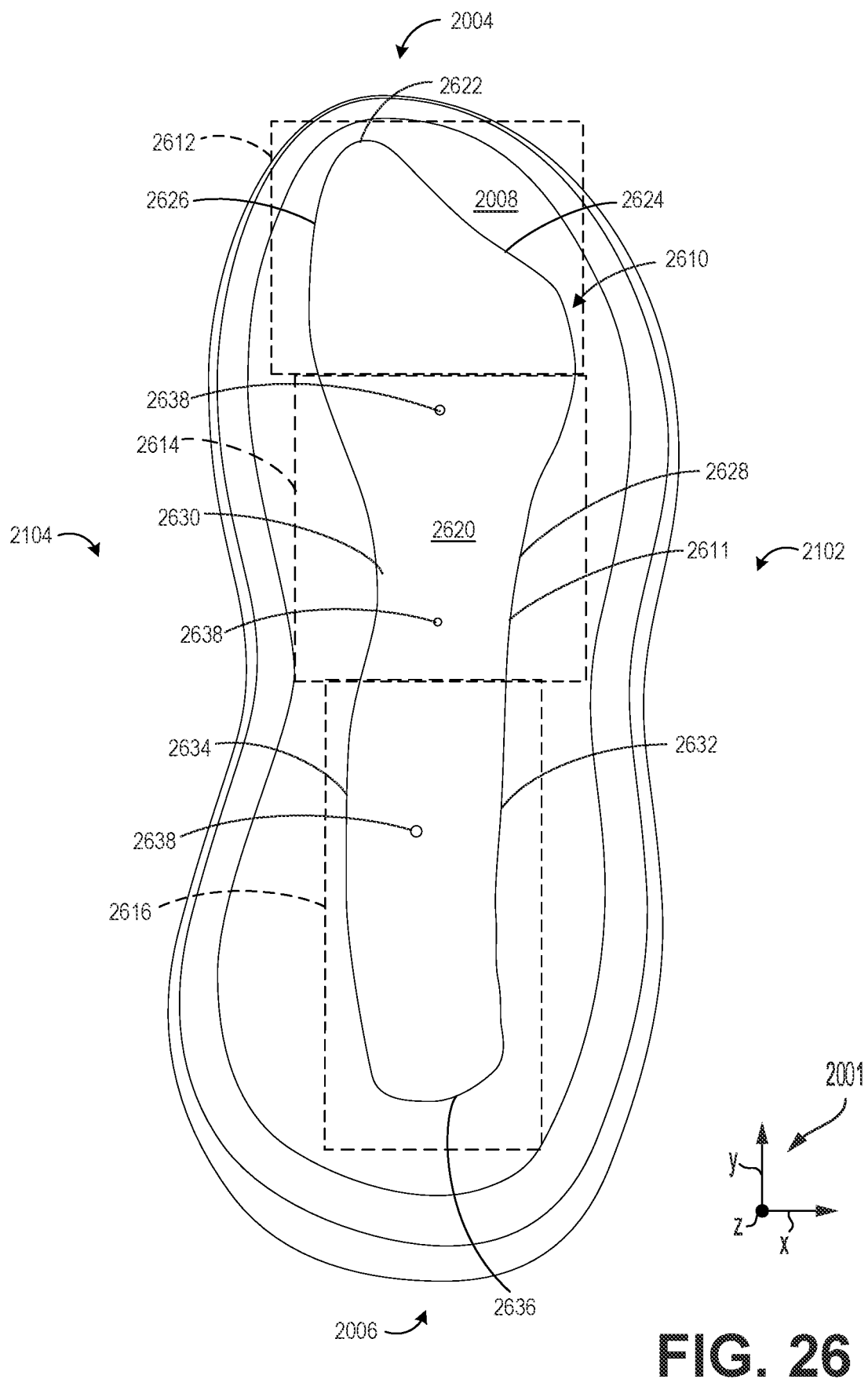
FIG. 26 shows a top view of a sixth example moderation plate coupled to an outsole.
Figure 27:
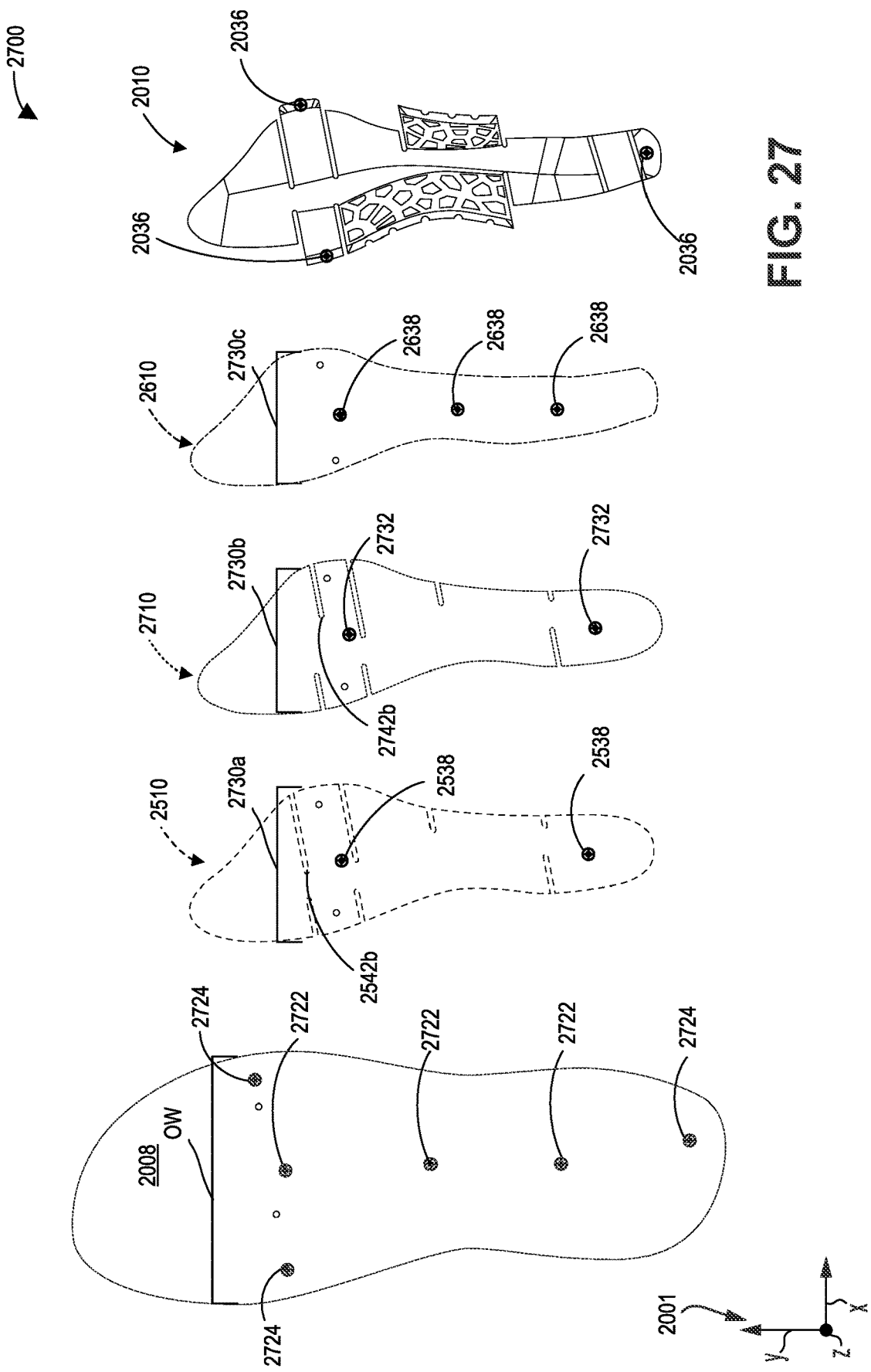
FIG. 27 schematically shows top views of the fourth, fifth, and sixth moderation plates and a seventh moderation plate compared to an outsole.

The D-plate 2010 is a complex moderation plate with multiple regions (e.g., the toe-off section 2012, midfoot section 2014, and heel section 2016) having different shapes and positioned at different elevations compared to more typical moderation plate design (e.g., the A-plate 2510 of FIG. 25, C-plate 2610 of FIG. 26, and B-plate 2710 of FIG. 27). This may result in complex plates, such as the D-plate 2010, being difficult to incorporate into a midsole. However, the D-plate 2010 may be positioned near/at the bottom of the midsole (and hence proximate to the outsole 2008) at a few coupling points and then the midsole may be formed around the D-plate using an injection molding process that results in the midsole being formed from a single type of foam. This simplified and streamlined manufacturing process may allow for the inclusion of complex moderation plates such as the D-plate as well as simpler moderation plates (such as the moderation plates as shown in more detail below) in midsoles using the same midsole mold. Thus, the manufacturing process described herein using the common midsole mold creates a midsole, such as midsole 802, that may be compatible with multiple plates of various geometries. Likewise, outsole 2008 may be compatible with a plurality of different types of moderation plates of different geometries and features.

FIGS. 25-28B show additional example moderation plates that may be incorporated into a midsole using the same mold and/or other common equipment used to manufacture midsoles including the D-plate. As illustrative examples, FIG. 25 shows a fifth example moderation plate (referred to as an A-plate 2510) and FIG. 26 shows a sixth example moderation plate (referred to as a C-plate 2610) that may be used in articles of footwear manufactured with outsole 2008.

FIG. 25 shows a visible outsole 2008 and an A-plate 2510. Relative to the outsole 2008 and A-plate 2510 are a toe side 2004, a heel side 2006, a lateral side 2102, and a medial side 2104. The A-plate 2510 is comprised of three regions: a toe-off section 2512, a midfoot section 2514, and a heel section 2516. The toe-off section 2512, midfoot section 2514, and heel section 2516 create a two dimensional structure against the outsole 2008.

The A-plate 2510 has an overall shape that mimics the shape of the foot, and further includes a few cutouts to promote flexibility. As such, the A-plate may have a curvature in the midfoot section 2514 that matches a curvature of the midfoot of the wearer. The A-plate may extend substantially along the foot of the wearer, from the toes to the heel. However, the A-plate may terminate farther from the heel end of the foot than the D-plate.

The A-plate 2510 may include retaining element receptors 2538. The retaining element receptors 2538 may be the same or similar to retaining element receptors 2036. For example, in FIG. 25, there may be two retaining element receptors 2538 used to couple the A-plate 2510 to the mold during manufacture. For this example, the retaining element receptors 2538 are centrally aligned, wherein retaining element receptors 2538 may be intersected by a line approximately parallel with the y-axis. However, it is to be appreciated that the position and amount of retaining element receptors may be non-limiting and other configurations for positioning the plates within the midsoles described herein may be used without departing from the scope of this disclosure (e.g., staples, adhesive, etc.). The retaining element receptors may include through-holes configured to accommodate respective retaining elements.

A plurality of cutouts, that may be referred to herein as channels, may be included across the A-plate along an axes approximately parallel with the x-axis. The plurality of channels may allow the A-plate 2510 to flex partially with the metatarsal and ankle joints of the foot of a user. The plurality of channels may allow for sections of the A-plate 2510 to flex partially with sheering motions of a foot of a user.

For example, FIG. 25 illustrates that the A-plate includes a first channel 2540a and a second channel 2540b in the toe-off section 2512, and a third channel 2542a and a fourth channel 2542b located in the midfoot section 2514. The first and second channels 2540a, 2540b and the third and fourth channels 2542a, 2542b may allow the A-plate to flex with the metatarsal joint of a foot. The A-plate further includes a fifth channel 2544 and a sixth channel 2546 near the heel section 2516 that may allow the A-plate to flex with the ankle joint of a foot.

Likewise, FIG. 26 shows an outsole 2008 and a C-plate 2610. The C-plate 2610 follows the curve (e.g., curve 2810) of the midsole of the footwear article, giving the footwear article a C like shape when viewed from the medial side 2104, described in greater detail with respect to FIG. 28B. Relative to the outsole 2008 and C-plate 2610 are a toe side 2004, a heel side 2006, a lateral side 2102, and a medial side 2104. The C-plate 2610 is comprised of three regions: a toe-off section 2612, a midfoot section 2614, and a heel section 2616. The sections 2612, 2614, and 2616 create an approximately two dimensional structures against the outsole 2008.

As shown in FIG. 26 the C-plate 2610 has a contiguous area 2620 with edges that are rounded and have a curvature. The area 2620 has a first tip 2622 that is rounded and extends longitudinally (e.g., parallel with the y-axis) toward the toe side 2004. The first tip 2622 may form into a first edge 2624 on the lateral side 2102 and a second edge 2626 on the medial side 2104 in the toe-off section 2612. The first edge 2624 is curved to a smaller degree compared to the first tip 2622 and is similar in shape to a dampened wave function. The second edge 2626 is curved to a lesser degree than the first tip 2622 and is similar in shape to a polynomial function.

The area 2620 has a third edge 2628 on the lateral side 2102 and a fourth edge 2630 on the medial side 2104 of the midfoot section 2614. The third edge 2628 may be smooth and possess curvature that becomes gradually more linear upon extending toward the heel side 2006. The fourth edge 2630 may possess multiple curves and inflection points, wherein the fourth edge 2630 curves away from and then back toward the medial side 2104.

The 2620 may be formed by a fifth edge 2632, a sixth edge 2634, and a seventh edge 2636 in the heel section 2616. Fifth and sixth edges 2632, 2634 are less curved and more linear compared to the third edge 2628 and fourth edge 2630. For one example, fifth and sixth edges 2632, 2634 extend favoring the length of the y-axis and curve away from the medial side 2104 toward the lateral side 2102. Sixth edge 2634 may be located closest toward the medial side 2104 and fifth edge 2632 may be located closest to lateral side 2102. The seventh edge 2636 is located near the heel side 2006. For one example length of the x-axis is tangential to the seventh edge 2636. The seventh edge 2636 is rounded with a curvature of a greater degree compared to the fifth edge 2632 and sixth edge 2634, while having a curvature of a lesser degree compared to curvature of the first tip 2622.

The C-plate 2610 may include retaining element receptors 2638. The retaining element receptors 2638 may be the same or similar to retaining element receptors 2036 and/or retaining element receptors 2538. For example, there may be three retaining element receptors 2638 used to couple the C-plate 2610 to the mold during manufacture. For this example, the retaining element receptors 2538 are centrally aligned, wherein retaining element receptors 2538 may be intersected by a line approximately parallel with the y-axis. However, it is to be appreciated that the position and amount of retaining element receptors may be non-limiting and other configurations for positioning the moderation plate within a midsole have been considered and contemplated. Further, the retaining element receptors may comprise through-holes to accommodate respective retaining elements.

The C-plate 2610 does not have a plurality of channels that cross the A-plate 2510. As a result, the C-plate 2610 may be more rigid and less flexible than the A-plate. The C-plate 2610 is smaller in width horizontally than the A-plate (at least at a narrowest portion of the C-plate, such as the center of fourth edge 2630) and may have a longer length longitudinally compared to the A-plate. The C-plate may have a curvature in the midfoot section 2614 that matches a curvature of the midfoot of the wearer. The C-plate may extend substantially along the foot of the wearer, from the toes to the heel. However, the C-plate may terminate farther from the heel end of the foot than the D-plate.

FIG. 27 schematically shows a set of example moderation plates 2700 compared to one another and the outsole 2008 of a footwear article. The set of example moderation plates 2700 includes the A-plate 2510, the C-plate 2610, and the D-plate 2010. FIG. 27 also shows an additional moderation plate (a seventh example moderation plate) in the form of the B-plate 2710.

Outsole 2008 may be compatible with a plurality of different types of moderation plates of different geometries and features, including the A-plate 2510, B-plate 2710, C-plate 2610, and D-plate 2010, as well as other moderation plates, such as the moderations plates of FIGS. 11-16.

The outsole includes a plurality of first coupling points 2722 and a plurality of second coupling points 2724. The first coupling points 2722 may correspond to positions where retaining element receptors 2538 on A-plate 2510, retaining element receptors 2732 on B-plate 2710, and retaining element receptors 2638 on C-plate 2610 are located and hence may represent areas of the outsole that are closest to the respective moderation plate. The second coupling points 2724 may correspond to positions where retaining element receptors 2036 on D-plate 2010 are located and hence may represent areas of the outsole that are closest to the D-plate. The outsole may have an outsole width (OW) that may be the widest portion of the outsole extending from the medial side to the lateral side of the outsole.

The A-plate 2510 and B-plate 2710 are have a similar area and shape. For one example, the width 2730a of the toe-off section 2512 of the A-plate 2510 is approximately the same as the width 2730b of the B-plate 2710. Each of widths 2730a and 2730b may be in a range of 60-70% of the OW, such as 66%. Additionally, both the A-plate and the B-plate may have a curved edge at the end of the heel section. The A-plate 2510 and B-plate 2710 may differ only in the placement of channels. For example, the channel 2542b of the A-plate is closer to the toe side 2004 than channel 2742b of the B-plate.

The C-plate 2610 differs in geometry and area with the A-plate 2510 and B-plate 2710. For example, the width 2730c of the toe-off section 2612 of the C-plate 2610 may be smaller than width 2730a and width 2730b of the A-plate 2510 and B-plate 2710, respectively, such as in a range of 55-65% of the OW. Additionally, the end of the heel section of the C-plate 2610 (as well as the end of the heel section of the D-plate) is less round and curved to a lesser degree than the end of the heel section of the A-plate 2510 and of the B-plate 2710.

FIG. 28A shows a top down view of the outsole 2008. FIG. 28B shows a footwear article 2800 from a view of the medial side 2104. FIG. 28A and FIG. 28B show the position of A-plate 2510, B-plate 2710, and C-plate 2610 relative to the outsole 2008 and superimposed over one another.

As illustrated in FIG. 28A, the A-plate 2510 and B-plate 2710 have a similar profile and differ only in the positioning of one cutout. C-plate 2610 is longer longitudinally, with respect to the y-axis, compared to the A-plate 2510 and B-plate 2710, wherein the first tip 2622 of the C-plate extends closer to the toe side 2004 and seventh edge 2636 of the C-plate extends closer to the heel side 2006 compared to the toe edge and heel edge of A-plate 2510, respectively. Each of the A-plate, B-plate, and C-plate have a curvature in the midfoot region that matches a curvature of the midfoot of a foot of a wearer, and the overall shape of each plate, from the toe section to the heel section, follows a center-of-pressure line of the foot.

FIG. 28A includes a longitudinal axis 2802 that extends from the upper most part of the toe section of the outsole and extends to the lower most part of the heel section of the outsole. The outsole may have an outsole length (OL) that extends along the longitudinal axis 2802. Each of the moderation plates may have a respective plate length (PL) that extends along the longitudinal axis 2802 when the moderation plates are positioned within a midsole of a footwear article. The PL of the A-plate (and the B-plate, which has nearly identical dimensions as the A-plate) may be in a range of 60-90% of the OL, such as 80% of the OL. The PL of the C-plate may be in a range of 85-95% of the OL, such as 90% of the OL. In this manner, both the A-plate and the C-plate may extend along a majority, such as at least 60%, or nearly all, such as 95%, of the length of the outsole.

FIG. 28B shows the position of the A-plate 2510, B-plate 2710, and C-plate 2610 between the outsole 2008 and the midsole 2802. Midsole 2802 may be formed from a mold that allows for midsole 2802 to be manufactured over/around moderation plates of varying geometries and areas. Midsole 2802 may be formed on outsole 2008 over the A-plate 2510, B-plate 2710, or C-plate 2610 during manufacturing or coupled to outsole 2008 after manufacture. For each of the A-plate, the B-plate, and the C-plate, a lower portion of the midsole may be positioned between the outsole and the moderation plate. Due to the shape of the moderation plates and curvature of the outsole and midsole, the thickness of the portion of the midsole positioned between the outsole and the moderation plate may vary across the length of the sole. For example, the portion of the midsole between the outsole and the moderation plate may thicker in the heel region than in the toe-off region.

The footwear article 2800 may also have an upper 2804 and insole 2806. The upper 2804 may enclose the top and sides of the foot of a user, and the insole 2806 may be spaced between the foot of a user and the midsole 2802. The insole 2806 may be a footbed that is the same or similar to insole 274.

For the example of the medial view shown in FIG. 28B, the A-plate 2510 and B-plate 2710 have a similar profile, that may be almost perfectly super imposed. Both the A-plate 2510 and B-plate 2710 have a similar profile as the insole 2806 and a foot of a user when viewed from the medial side 2104. The A-plate 2510 and the B-plate 2710 may be coupled to the mold during manufacture with two retaining elements and are not coupled at the center of the plates, which results in the A-plate and B-plate being positioned above the top of the outsole (and in a more intermediate portion of the midsole) at the center of the plates. In contrast, the C-plate is coupled with three retaining elements, which may maintain the C-plate in position along the top of the outsole and bottom of the midsole, across the entire length of the C-plate. As a result, the C-plate may have a curvature that matches the curvature of the outsole/bottom of the midsole. When the C-plate is incorporated into a footwear article such as footwear article 100 of FIG. 1A, the C-plate may curve along the longitudinal axis with a constant curvature, as explained above for a midsole with constant curvature (e.g., midsole 302). By including the middle retaining element receptor, the C-plate may be held along the top of the outsole/bottom of the midsole and have a curvature that matches the outsole/bottom of the midsole, without requiring the C-plate be manufactured with the curvature, which may simplify the manufacture process and reduce costs. Further, the C-plate may be easily customized for a particular wearer's gait by including or not including the middle retaining element (in a middle retaining element receptor) depending on the specifics of the wearers gait.

The C-plate 2610 follows the curve 2810 of the midsole 2802 of the footwear article 2700, giving the footwear article 2700 a C like shape. The C-plate 2610 as the mirroring of the curve 2611 may improve the efficiency of the gait of the user. The shape of the C-plate 2610 positions may place the C-plate 2610 closer to the ground in the heel compared to other moderation plates for maximum energy capture at heel strike. The toe-off section 2612 of C-plate 2610 may be close to the foot to of the user of the footwear article 2700 to promote maximum propulsion.

FIG. 29A shows a top down view of the outsole 2008. FIG. 29B shows a footwear article 2900 from a view of the medial side 2104. FIG. 29A and FIG. 29B show the D-plate 2010 positioned on the outsole 2008.

As an illustrated example, in FIG. 29A the second coupling points 2724 of the outsole 2008 are aligned with the retaining element receptors 2036 of the D-plate 2010. The coupling points 2724 (as well as the coupling points 2724) may represent areas of the outsole next to or adjacent the retaining element receptors of the D-plate (or the other plates described herein). FIG. 29A also includes a longitudinal axis 2902, similar to the longitudinal axis that extends from the upper most part of the toe section of the outsole and extends to the lower most part of the heel section of the outsole. The outsole may have an outsole length (OL) that extends along the longitudinal axis 2902. The D-plate may have a plate length (PL) that extends along the longitudinal axis 2902 when the D-plate is positioned within a midsole of a footwear article. The PL of the D-plate may be in a range of 85-95% of the OL, such as 90% of the OL. In this manner, the D-plate may extend along a majority, or nearly all, of the length of the outsole. The D-plate may not have a greatest width that corresponds in position to the widths of the A- B- and C-plates as described above, given the different sections, cutouts, and the 3-dimensional nature of the D-plate. At the same location as the OW described above, the D-plate may have an overall width that extends from the medial edge of the joint support 2031 to a lateral edge of the joint support 2031, where the overall width may be in a range of 70-80% of the OW, though only a portion of the joint support (e.g., 20%) forms the center pressure support that is positioned proximate to the top of the midsole/the foot.

FIG. 29B shows the position of the D-plate between the outsole 2008 and within the midsole 2802. The toe support 2018, second area 2028, heel support 2144 and center pressure support 2026 may be elevated above the outsole 2008 and abut the top of the midsole 2802. The toe support 2018, second area 2028, heel support 2144, and center pressure support 2026 may support the midsole 2802 and the foot of the user. The heel coupling region 2034 may abut the top surface of the outsole 2008. The first and second coupling areas 2032*a*, 2032*b* may partially abut the top surface of the outsole 2008 or be positioned within close proximity (e.g., within 1 mm) of the top surface of the outsole 2008. Portions of the first and second outrigger webs 2024*a*, 2024*b* may abut the top surface of the outsole 2008 or be positioned within close proximity (e.g., within 1 mm) of the top surface of the outsole 2008. The incline region 2142 and a majority of the first and second outrigger webs 2024*a*, 2024*b* may be suspended above the top surface of the outsole 2008 and suspended in the foam of the midsole 2802. The incline region 2142 and first and second outrigger webs 2024*a*, 2024*b* may be elastically compressed with the foam of the midsole 2802.

Compared to the A-plate 2510, B-plate 2710, and C-plate 2610, the D-plate 2010 has a greater height with respect to the z-axis and components that may be closer to the insole 2806 and by extension foot of a user. D-plate 2010 also has a larger area of material, such as the first and second outrigger web 2024*a*, 2024*b*, visible from the medial side 2104 compared to the A-plate 2510, B-plate 2710, and C-plate 2610. Material of the A-plate 2510, B-plate 2710, and C-plate 2610 is thinner with respect to the z-axis. Additional, the D-plate 2010 is wider in the midfoot section 2014 in comparison to the A-plate 2510 and C-plate 2610 in with respect to the x-axis. Comparing dimensions of D-plate 2010 to A-plate 2510, B-plate 2710, and C-plate 2610 in FIG. 28A-29B shows the versatility of the midsole 2802 and the modular midsole mold. The modular mold of midsole 2802 allows for midsole 2802 may be formed over the D-plate 2010 as well as similar plates. A lower portion of the midsole may be positioned between the outsole and the D-plate, at least across some regions of the D-plate. Due to the shape of the D-plate and curvature of the outsole and midsole, the thickness of the portion of the midsole positioned between the outsole and the D-plate may vary across the width length of the sole. For example, the portion of the midsole between the outsole and the moderation plate may thicker in the heel region than in the toe region.

Thus, the moderation plates described herein may display curvature and elevational positioning to facilitate the walking support and force distribution described herein. The moderation plates may curve in one or more regions out of an x-y plane (e.g., parallel to ground) when positioned in a midsole of a footwear article. The curvature may match a curvature of a lower/bottom surface of the midsole and/or the curvature may match a curvature of a top/upper surface of the midsole. In some examples, a moderation plate may be entirely curved from the heel region to the toe-off region with constant or near constant curvature, while other moderation plates may only curve in select regions. For example, a moderation plate may have a midfoot region/section that does not curve with a curvature that matches the lower surface of the midsole, but that does curve in the heel and/or toe-off regions. In another example, the midfoot section may include a first element and a second element each extending below a center-of-pressure support and each comprising a bottom coupling surface positioned proximate the outsole and having a curvature that matches the curvature of the lower surface of the midsole. In such examples, the center-of-pressure support may not have the curvature that matches the curvature of the lower surface of the midsole. Further, the moderation plates described herein may have varying position relative to the lower and upper surfaces of the midsole, with portions of the moderation plate being closer to the lower surface and other portions being closer to the upper surface.

Figure 30:
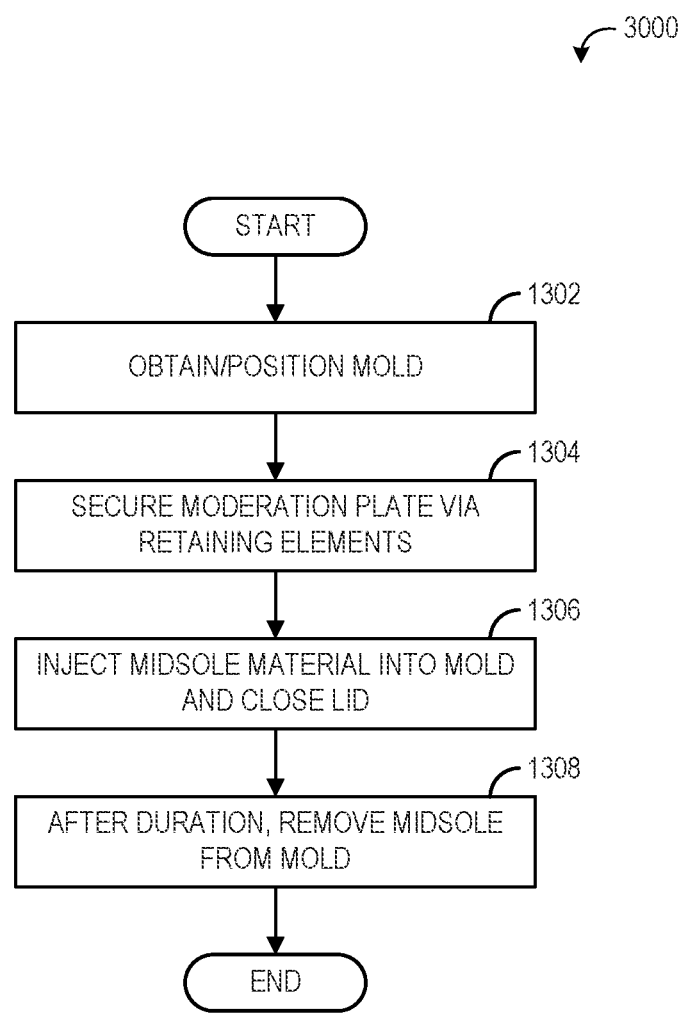
FIG. 30 is a flow chart illustrating a method of manufacturing an article of footwear according to an embodiment of the present disclosure.

To manufacture a footwear article including a moderation plate as described herein, a method, such as method 3000 of FIG. 30, may be performed. Method 3000 includes, at 3002, obtaining and positioning a mold. In some examples, an outsole may be positioned in the mold (e.g., at the bottom of the mold) or the mold may be positioned on the outsole. However, in other examples, the midsole may be formed separately from the outsole and then coupled to the outsole using adhesive or other suitable mechanism. The mold may define the shape of the midsole. At 3004, method 3000 includes securing a selected moderation plate to the mold via retaining elements of the moderation plate (which may be direct, localized retaining elements in some examples). The selected moderation plate (such as the D-plate or C-plate described herein) may be positioned on and secured to the mold via the retaining elements (e.g., pins) described above. For example, if the D-plate is the selected moderation plate, the D-plate may be secured to the mold by inserting the three retaining elements through the three retaining element receptors 2036. If the C-plate is the selected moderation plate, the C-plate may be secured to the mold by inserting the three retaining elements through the retaining element receptors 2638. If the A-plate is the selected moderation plate, the A-plate may be secured to the mold by inserting the two retaining elements through the retaining element receptors 2538.

At 3006, the midsole material is injected into the mold and a cover/lid of the mold is closed/positioned on the top of the mold. In this way, the midsole may be formed around the moderation plate (e.g., the D-plate) by injection molding, e.g., a suitable material (e.g., molten polyurethane (PU), EVA, or PEBA) may be injected into the mold and a cover of the mold may be closed, where the cover defines the shape of the top surface of the midsole. At 3008, the midsole is removed from the mold after a duration. Thus, the midsole may be released from the mold after a period of time has expired during which the material forming the midsole may have dried/solidified/cooled. Additional components of the footwear article (e.g., outsole, upper, insole, etc.) may then be added to form the final footwear article. In some examples, the midsole may be incorporated around the moderation plate such that an entirety of a perimeter of the moderation plate is coupled to/surrounded by the midsole. In some examples, an entirety of the top surface of the moderation plate may be coupled to/surrounded by the midsole. In other examples, only a portion or portions of the top surface of the moderation plate may be coupled to/surrounded by the midsole or none of the top surface of the moderation plate may be coupled to/surrounded by the midsole. In still further examples, an entirety of the bottom surface of the moderation plate may be coupled to/surrounded by the midsole. In other examples, only a portion or portions of the bottom surface of the moderation plate may be coupled to/surrounded by the midsole or none of the bottom surface of the moderation plate may be coupled to/surrounded by the midsole.

The same mold may be used to manufacture additional footwear articles. For example, after a first midsole including the D-plate is released from the mold, a second midsole may be formed using the same process, but in some examples with a different moderation plate positioned therein. As an example, the C-plate may be positioned on the mold and secured via retaining element receptors 2638 and the second midsole may be formed around the C-plate via injection molding.

While an example manufacturing process including injection molding has been provided herein, it is to be appreciated that other manufacturing methods may be used without departing from the scope of this disclosure. For example, the footwear articles described herein may be manufactured using cement construction where a pre-formed outsole is cemented/glued to a pre-formed midsole, and this in turn is cemented/glued to a pre-formed upper. A moderation plate as described herein may be incorporated into the sole by directly coupling the moderation plate to the outsole and then coupling the midsole to the moderation plate and outsole or by incorporating the moderation plate into the midsole during formation of the midsole. For example, the moderation plate may be coupled on a top of the midsole and configured to be positioned between the midsole and the insole. In another example, the midsole may be constructed from two pieces and the moderation plate may be positioned between the two pieces that are then glued/cemented together. The midsole may be constructed out of suitable material, including but not limited to EVA, PU, gel, or other foams. The moderation plate may be formed from a suitable material, including but not limited to thermoplastic elastomers (e.g., pebax, nylon) or composite materials (e.g., carbon fiber).

In another representation, a method of manufacturing a footwear article includes positioning a moderation plate to relative to a mold via two or more retaining element receptors of the moderation plate; and injecting midsole material into the mold to form a midsole around the moderation plate. In a first example of the method, the footwear article is a first footwear article, the outsole is a first outsole, the moderation plate is a first moderation plate, and the midsole is a first midsole, and the method further includes manufacturing a second footwear article by: after the first midsole has been removed from the mold, positioning a second moderation plate relative to the mold via two or more retaining element receptors of the second moderation plate; and injecting the midsole material into the mold to form a second midsole around the second moderation plate. In a second example of the method, optionally including the first example, the first moderation plate differs from the second moderation plate in one or more of length, width, number or position of cut-outs, and position relative to a respective outsole.

It will be appreciated that the configurations and/or approaches described herein are exemplary in nature, and that these specific embodiments or examples are not to be considered in a limiting sense, because numerous variations are possible. The subject matter of the present disclosure includes all novel and nonobvious combinations and sub-combinations of the various features, functions, acts, and/or properties disclosed herein, as well as any and all equivalents thereof.

The invention claimed is:

1. A footwear article, comprising:
an upper;
a midsole coupled to the upper;
an outsole coupled to the midsole; and
a moderation plate positioned within the midsole, the moderation plate including a toe-off section, a heel section, and a midfoot section positioned intermediate the toe-off section and the heel section, the moderation plate having a plate length that is within a range of 60-95% of an outsole length of the outsole, wherein the midfoot section includes a center support positioned along a top of the midsole, and wherein a first outrigger web extends from the center support to a bottom of the midsole on a medial side of the moderation plate and a second outrigger web extends from the center support to the bottom of the midsole on a lateral side of the moderation plate, each of the first outrigger web and the second outrigger web comprising a plurality of openings.

2. The footwear article of claim 1, wherein at least a portion of the midsole is positioned between the moderation plate and the outsole.

3. The footwear article of claim 1, wherein the toe-off section includes a toe support coupled to a joint support, and wherein the joint support includes a medial side region and a lateral side region each extending below a center area of the joint support, the center area coupled to the center support and to the toe support.

4. The footwear article of claim 1, wherein the midfoot section has a medial edge that includes a curvature that matches a curve of a midfoot of a wearer of the footwear article.

5. The footwear article of claim 1, wherein the midsole has a lower surface of constant curvature extending from a heel of the midsole to a toe of the midsole, and wherein the constant curvature is the constant curvature of a cylinder.

6. The footwear article of claim 1, wherein the heel section includes a heel support coupled to the center support and extending along the top of the midsole, a heel coupling region extending along the bottom of the midsole, and an incline region coupling the heel support to the heel coupling region.

7. The footwear article of claim 6, wherein the toe-off section includes a toe support coupled to a joint support, and wherein the joint support includes a medial side region and a lateral side region each extending below a center area of the joint support, the center area coupled to the center support and to the toe support.

8. The footwear article of claim 7, wherein the heel coupling region, the medial side region, and the lateral side region each include a retaining element receptor.

9. The footwear article of claim 7, wherein the heel support, the center support, the center area, and the toe support form a center-of-pressure support that is configured to align with a center-of-pressure line of a foot of a wearer of the footwear article.

10. A footwear article, comprising:
an upper;
a midsole coupled to the upper;
an outsole coupled to the midsole; and
a moderation plate positioned within the midsole, the moderation plate including a center-of-pressure support that spans a toe-off section, a heel section, and a midfoot section positioned intermediate the toe-off section and the heel section, the center-of-pressure support elevated above the outsole, and the midfoot section including a first outrigger web that extends from the center-of-pressure support to a bottom of the midsole on a medial side of the moderation plate and a second outrigger web that extends from the center-of-pressure support to the bottom of the midsole on a lateral side of the moderation plate, each outrigger web extending below the center-of-pressure support and each comprising a plurality of openings.

11. The footwear article of claim 10, wherein the first outrigger web comprises a first bottom coupling surface positioned proximate the outsole and the second outrigger web comprises a second bottom coupling surface positioned proximate the outsole.

12. The footwear article of claim 10, wherein the center-of-pressure support curves in one or more directions to match a curvature of a top of the midsole, and wherein the center-of-pressure support is formed from a heel support of the heel section, a center support of the midfoot section, and a center area and a toe support of the toe-off section.

13. The footwear article of claim 12, wherein the heel support is coupled to the center support, wherein the heel section further includes a heel coupling region and an incline region coupling the heel support to the heel coupling region, wherein the toe-off section includes the toe support coupled to a joint support, wherein the joint support includes a medial side region and a lateral side region each extending below the center area of the joint support, the center area coupled to the center support and to the toe support, and wherein the heel coupling region, the medial side region, and the lateral side region are each coupled to the outsole.

14. A footwear article, comprising:
an upper;
a midsole coupled to the upper, the midsole having a lower surface of curvature extending from a heel of the midsole to a toe of the midsole, wherein the constant curvature is the constant curvature of a cylinder;
an outsole coupled to the midsole; and
a moderation plate positioned within the midsole, at least a portion of the moderation plate having a plate curvature that matches the curvature of the lower surface of the midsole, the moderation plate including a midfoot section that includes a center support positioned along a top of the midsole, a first outrigger web that extends from the center support to a bottom of the midsole on a medial side of the moderation plate, and a second outrigger web extends from the center support to the bottom of the midsole on a lateral side of the moderation plate, each of the first outrigger web and the second outrigger web comprising a plurality of openings.

15. The footwear article of claim 14, wherein the center-of-pressure support spans a toe-off section, a heel section, and the midfoot section positioned intermediate the toe-off section and the heel section, the center-of-pressure support elevated above the outsole, and each outrigger web comprising a bottom coupling surface positioned proximate the outsole and having the plate curvature that matches the curvature of the lower surface of the midsole.

16. The footwear article of claim 14, wherein the curvature of the lower surface of the midsole is a constant curvature of a cylinder.

* * * * *